US011978318B2

(12) United States Patent
Bryant et al.

(10) Patent No.: US 11,978,318 B2
(45) **Date of Patent: *May 7, 2024**

(54) GAMING SYSTEM

(71) Applicant: Aristocrat Technologies Australia Pty Limited, North Ryde (AU)

(72) Inventors: Natalie Bryant, Cherrybrook (AU); Philip Seifert, Macquarie Park (AU); Nicole Hedley, Wahroonga (AU); Ronald Dy, Macquarie Park (AU); Doanh Dang, North Rocks (AU); Oliver Crispino, Rosemeadow (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,817

(22) Filed: Apr. 26, 2023

(65) Prior Publication Data

US 2023/0260369 A1 Aug. 17, 2023

Related U.S. Application Data

(63) Continuation of application No. 17/545,715, filed on Dec. 8, 2021, now Pat. No. 11,676,456, which is a (Continued)

(30) Foreign Application Priority Data

Feb. 6, 2019 (AU) ................................ 2019900375
Feb. 6, 2019 (AU) ................................ 2019900376
(Continued)

(51) Int. Cl.
*G07F 17/34* (2006.01)
*G07F 17/32* (2006.01)

(52) U.S. Cl.
CPC ...... *G07F 17/3267* (2013.01); *G07F 17/3213* (2013.01); *G07F 17/3244* (2013.01); *G07F 17/3265* (2013.01); *G07F 17/34* (2013.01)

(58) Field of Classification Search
CPC ............. G07F 17/3267; G07F 17/3213; G07F 17/3244; G07F 17/3265; G07F 17/34
(Continued)

(56) References Cited

U.S. PATENT DOCUMENTS 9,123,210 B2 9/2015 Bennett
11,676,456 B2 * 6/2023 Bryant ................ G07F 17/3265 463/20
(Continued)

OTHER PUBLICATIONS

Office Action dated Jan. 29, 2021 for U.S. Appl. No. 16/783,162 (pp. 1-20).
(Continued)

*Primary Examiner* — Jay Trent Liddle
*Assistant Examiner* — Ryan Hsu
(74) *Attorney, Agent, or Firm* — Brownstein Hyatt Farber Schreck, LLP

(57) ABSTRACT

Certain embodiments involve a system comprising at least one processor; and a memory storing instructions which when executed by the at least one processor cause the at least one processor to: cause a first symbol array to be selected and displayed on at least one display in a display area, the first symbol array including a plurality of selected symbols from each reel of a plurality of reels at respective symbol locations of the display area; add at least one first Wild symbol to the display; cause a second symbol array to be selected and displayed on the at least one display in the display area, the second symbol array including a plurality of selected symbols from each reel at the respective symbol locations of the display area; add at least one second Wild
(Continued)

symbol to the display; and move the at least one first Wild symbol relative to the display area.

20 Claims, 28 Drawing Sheets

Related U.S. Application Data continuation of application No. 16/783,162, filed on Feb. 5, 2020, now Pat. No. 11,217,065.

(30) Foreign Application Priority Data

| | | |
|---|---|---|
| Feb. 6, 2019 | (AU) | 2019900377 |
| Feb. 6, 2019 | (AU) | 2019900378 |
| Sep. 27, 2019 | (AU) | 2019236742 |
| Sep. 27, 2019 | (AU) | 2019236743 |
| Sep. 27, 2019 | (AU) | 2019236744 |
| Sep. 27, 2019 | (AU) | 2019236745 |

(58) Field of Classification Search
USPC .......... 463/20
See application file for complete search history.

(56) References Cited

U.S. PATENT DOCUMENTS

| | | | | |
|---|---|---|---|---|
| 2004/0048646 | A1 | 3/2004 | Martin | |
| 2006/0189376 | A1 | 8/2006 | Hornik | |
| 2007/0060348 | A1 | 3/2007 | Svanas | |
| 2008/0108411 | A1 | 5/2008 | Jensen | |
| 2010/0029381 | A1 | 2/2010 | Vancura | |
| 2014/0323198 | A1 | 10/2014 | Tuck | |
| 2015/0057068 | A1 | 2/2015 | Burghard | |
| 2016/0104345 | A1 | 4/2016 | MacGregor | |
| 2016/0140795 | A1 | 5/2016 | Fong | |
| 2016/0171818 | A1* | 6/2016 | Mills | G07F 17/326 463/20 |
| 2017/0092050 | A1 | 3/2017 | Kitamura | |

OTHER PUBLICATIONS

Office Action dated Jan. 29, 2021 for U.S. Appl. No. 16/784,237 (pp. 1-21).
Office Action dated Feb. 23, 2021 for U.S. Appl. No. 16/784,243 (pp. 1-16).
Office Action dated Apr. 1, 2021 for U.S. Appl. No. 16/784,241 (pp. 1-15).
Office Action (Final Rejection) dated Oct. 20, 2021 for U.S. Appl. No. 16/784,243 (pp. 1-7).
Office Action (Notice of Allowance and Fees Due (PTOL-85)) dated Sep. 9, 2021 for U.S. Appl. No. 16/783,162 (pp. 1-9).
Office Action (Final Rejection) dated Sep. 24, 2021 for U.S. Appl. No. 16/784,237 (pp. 1-8).
Office Action (Notice of Allowance and Fees Due (PTOL-85)) dated Sep. 22, 2021 for U.S. Appl. No. 16/784,241 (pp. 1-8).
Office Action (Notice of Allowance and Fees Due (PTOL-85)) dated Dec. 9, 2021 for U.S. Appl. No. 16/784,241 (pp. 1-2).
Office Action (Notice of Allowance and Fees Due (PTOL-85)) dated Dec. 9, 2021 for U.S. Appl. No. 16/783,162 (pp. 1-2).
Office Action (Notice of Allowance and Fees Due (PTOL-85)) dated Mar. 9, 2022 for U.S. Appl. No. 16/784,243 (pp. 1-10).
Office Action (Notice of Allowance and Fees Due (PTOL-85)) dated Mar. 10, 2022 for U.S. Appl. No. 16/784,237 (pp. 1-9).
Office Action (Notice of Allowance and Fees Due (PTOL-85)) dated Mar. 31, 2023 for U.S. Appl. No. 17/544,747 (pp. 1-9).
Office Action (Notice of Allowance and Fees Due (PTOL-85)) dated Mar. 31, 2023 for U.S. Appl. No. 17/545,715 (pp. 1-10).
Office Action (Notice of Allowance and Fees Due (PTOL-85)) dated Apr. 20, 2023 for U.S. Appl. No. 17/544,747 (pp. 1-2).
Notice of Allowance dated Apr. 28, 2023 for U.S. Appl. No. 17/545,715 (pp. 1-2).

* cited by examiner

400

421 422 423 424 425

| | Reel position | Reel 1 | Reel 2 | Reel 3 | Reel 4 | Reel 5 |
|---|---|---|---|---|---|---|
| 401 | 1 | Pic 1 | Trigger symbol (436) | Pic 3 | Q | Pic 1 (430) |
| 402 | 2 | K | Q | Trigger symbol (436) | A | 10 |
| 403 | 3 | Trigger symbol (436) | K | 10 | 10 | A (430) |
| 404 | 4 | Q | A | Q | Pic 2 | Pic 2 |
| 405 | 5 | 10 | Pic 2 | K | J | A |
| 406 | 6 | A | 9 | Pic 1 | Trigger symbol (436) | Q |
| 407 | 7 | Pic 2 | Pic 1 | J | 9 | K |
| 408 | 8 | A | Pic 3 | Pic 2 | 10 | Pic 3 |
| 409 | 9 | Q | Q | 9 | A | 9 |
| 410 | 10 | Trigger symbol (436) | 10 | Q | Q | K (430) |
| 411 | 11 | J (441) | A | 10 | J | 9 |
| 412 | 12 | 10 (442) | J | K | K | Q |
| 413 | 13 | Pic 3 (443) | K | Trigger symbol (436) | 9 | 10 |
| 414 | 14 | K | J | A | Pic 3 | J (430) |
| 415 | 15 | 9 | 10 | J | Pic 1 | Trigger symbol (436) |

443 442 441

FIG. 4

GAMING SYSTEM

CROSS-REFERENCE TO RELATED APPLICATIONS

This application is a continuation of U.S. patent application Ser. No. 17/545,715, filed Dec. 8, 2021, which is a continuation of U.S. patent application Ser. No. 16/783,162, filed Feb. 5, 2020, now U.S. Pat. No. 11,217,065, the disclosures of which are hereby incorporated by reference. U.S. patent application Ser. No. 16/783,162 claims priority to the following patent applications: Australian Pat. App. No. 2019900378, filed Feb. 6, 2019; Australian Pat. App. No. 2019236745, filed Sep. 27, 2019; Australian Pat. App. No. 2019900375, filed Feb. 6, 2019; Australian Pat. App. No. 2019236742, filed Sep. 27, 2019; Australian Pat. App. No. 2019900376, filed Feb. 6, 2019; Australian Pat. App. No. 2019236743, filed Sep. 27, 2019; Australian Pat. App. No. 2019900377, filed Feb. 6, 2019; and Australian Pat. App. No. 2019236744, filed Sep. 27, 2019, all of which are hereby incorporated herein by reference.

FIELD

The present application relates to a gaming system and to a method of gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A described gaming system implements a game that provides a player with a feature wherein Wild symbols are added in a game spin and move relative to a display area until moved out of the display area, and if a Wild symbol is added to a symbol location that already includes an added Wild symbol, the Wild symbols 'explode' to cause at least some symbol locations adjacent the Wild symbols to also become Wild.

A described gaming system implements an arrangement wherein during a game different displayed components are shaken independently to give an impression of instability, for example in order to complement a volcano game theme.

A described gaming system implements an arrangement wherein during game play a character is always displayed to a player, but based on defined criteria, such as based on occurrence of defined events during a game, the character interacts with the symbol display area, for example to give the impression that the character is causing a feature to occur.

A described gaming system implements a game that provides a player with a feature wherein an action carried out in a second game spin is dependent on a game state after a previous first game spin, for example based on the configuration of the display area after the first spin such as the number of symbol rows present after the first spin, or based on the number of Wild columns present after the first spin.

A gaming system is described that comprises at least one display, a game controller that includes at least one processor and at least one memory device. The at least one processor, the at least one memory device, and the at least one display are operably connected. The at least one memory device stores computer-readable instructions for controlling the at least one processor to cause a first symbol array to be selected and displayed on the at least one display in a display area, the first symbol array including a plurality of selected symbols from each reel of a plurality of reels at respective symbol locations of the display area. The processor is also controlled to add at least one first Wild symbol to the display, and to cause a second symbol array to be selected and displayed on the at least one display in the display area, the second symbol array including a plurality of selected symbols from each reel at the respective symbol locations of the display area. The processor is caused to add at least one second Wild symbol to the display, and to move the at least one first Wild symbol relative to the display area, the at least one added first Wild symbol being persistent until moved from the display area. If a second Wild symbol is added to a symbol location that includes a first Wild symbol, the processor is controlled to add a plurality of further Wild symbols to respective symbol locations adjacent the symbol location that includes first and second Wild symbols. The processor is also controlled to determine whether the second symbol array, the at least one first Wild symbol, the at least one second Wild symbol and the at least one further Wild symbol displayed in the display area correspond to a winning outcome, and award a prize if a winning outcome is determined to exist.

A gaming system is also described that comprises at least one display, and a game controller that includes at least one processor and at least one memory device. The at least one memory device stores computer-readable instructions for controlling the at least one processor to cause a symbol array to be selected and displayed on the at least one display in a display area, the symbol array including a plurality of selected symbols from each reel of a plurality of reels at respective symbol locations of the display area. The processor also causes at least 2 displayed components to independently shake in response to game play thereby providing an instability effect.

A gaming system is also described that comprises at least one display, a game controller that includes at least one processor and at least one memory device. The at least one memory device stores computer-readable instructions for controlling the at least one processor to cause a symbol array to be selected and displayed on the at least one display in a display area, the symbol array including a plurality of selected symbols from each reel of a plurality of reels at respective symbol locations of the display area. The processor also causes a character to always be displayed, and causes the character to interact with the symbol display area based on defined criteria.

A gaming system is also described that comprises at least one display, a game controller that includes at least one processor and at least one memory device. The at least one processor, the at least one memory device, and the at least one display are operably connected. The at least one memory device stores computer-readable instructions for controlling the at least one processor to cause a first symbol array to be selected and displayed on the at least one display in a display area, the first symbol array including a plurality of selected symbols from each reel of a plurality of reels at respective symbol locations of the display area. The processor also causes a prize to be awarded if the first symbol array is determined to correspond to a winning outcome. The processor also causes a second symbol array to be selected and displayed on the at least one display in the display area, the second symbol array including a plurality of selected symbols from each reel at the respective symbol locations of the display area. The processor also determines a modification to the display area or to at least one symbol displayed in the display area based on a game state after the determination of the winning outcome for the first symbol array selection. The processor also modifies the display area or the at least one symbol displayed in the display area if the determination is that a modification is to be implemented, and awards a prize if a winning outcome is determined to exist.

BRIEF DESCRIPTION OF THE DRAWINGS

FIG. 4 illustrates an example reel strip layout.

DETAILED DESCRIPTION

The detailed description presents innovations in user interface ("UI") features of electronic gaming devices ("EGMs"), as well as innovations in features of back-end processing for supporting such EGMs, performing unique game mechanics that also satisfy relevant gaming regulations, and/or aid in the implementation of the UI features. In one embodiment, for example, the standard game play process involves implementing a base game with a Wild feature in which a Wild symbol is introduced, and after a number of spins, removed. This momentary persistence of wild symbols temporarily increases the near-term RTP, while marginally increasing the long-term RTP, keeping the expected RTP within predetermined levels. In some implementations of this embodiment, a game controller automatically selects a number of Wild symbols to be added and automatically selects the locations in or below the display area that will receive the Wild symbols. Still further, and in one example implementation, if multiple Wild symbols are added to the same symbol position, the symbol position is modified to become a special Wild symbol that provides an award at the conclusion of Wild feature. Special Wild symbols have a similar appearance to the added Wild symbols but that, unlike the added Wild symbols, the special Wild symbols are not persistent in that they are removed after completion of each base game. In other embodiments, an eruption feature is disclosed. As part of the eruption feature, a reel is randomly select to become a wild reel in which all symbol positions on the reel symbol operate as Wild symbols. Still further, in some implementations, as part of the eruption feature, a symbol position is randomly selected to locate an additional Wild symbol; and, if the selected symbol position already has a Wild symbol, the Wild symbol at the selected symbol position is modified and/or relabeled to be a special Wild symbol. As a result, the disclosed technology provides numerous innovations that provide the user with several game play options that continue to maintain the same designated RTP (e.g., as may be required by jurisdictional regulations). Various other improvements and features are also disclosed.

Figure 1:
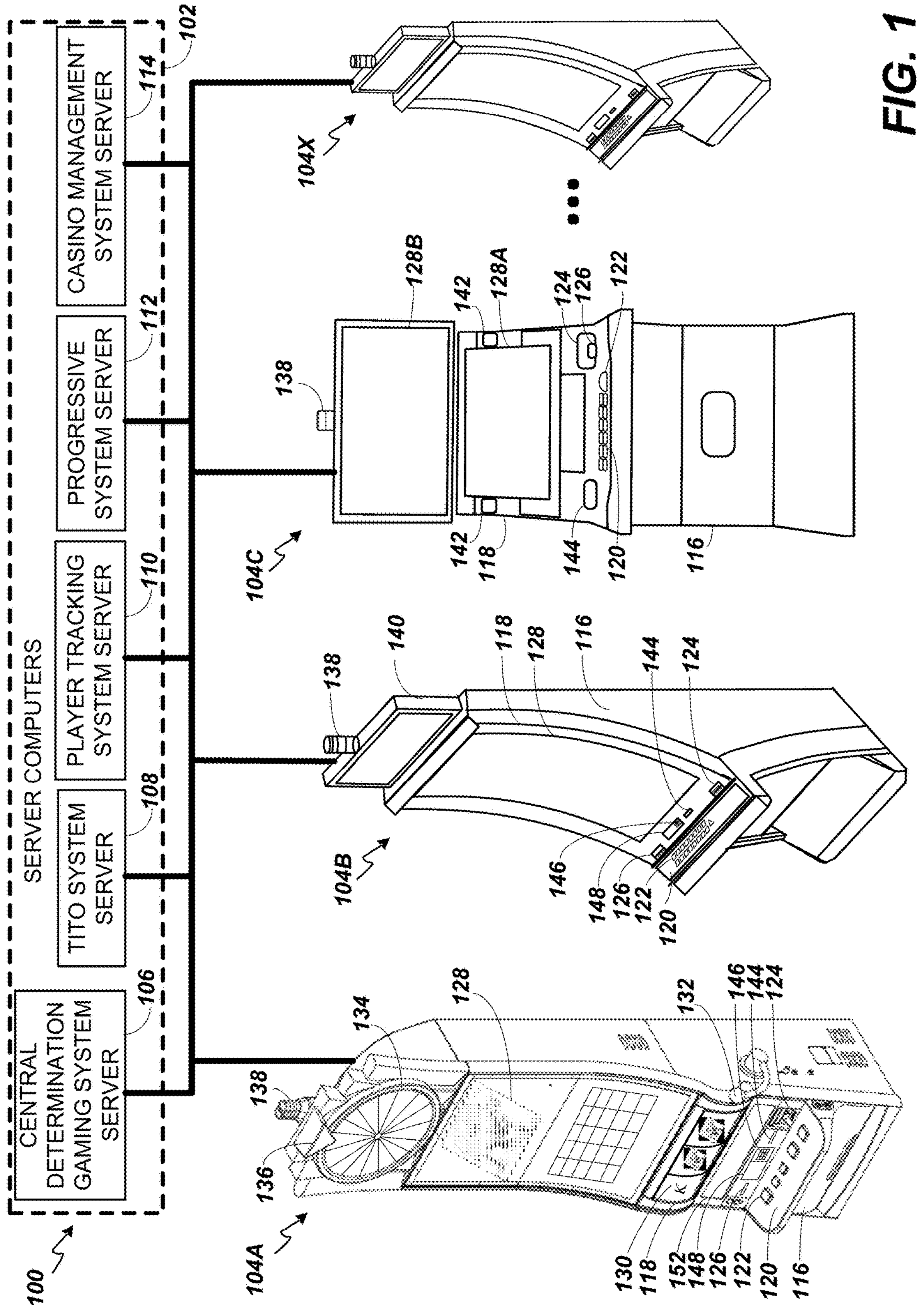
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 1048 or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
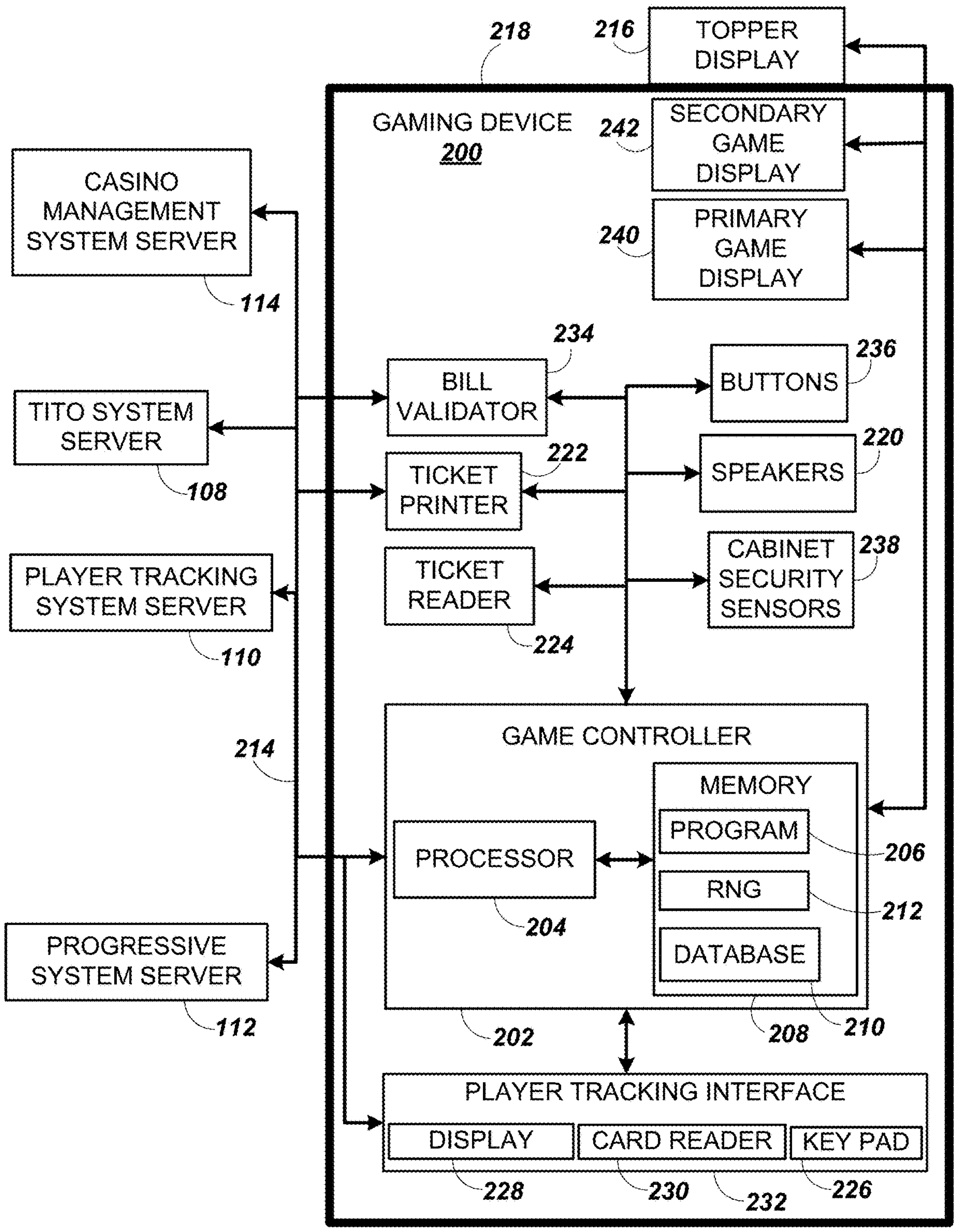
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 1048 illustrated in FIG. 1 is the Arc™ model gaming device manufactured by Aristocrat® Technologies, Inc. Note that where possible, reference numerals identifying similar features of the gaming device 104A embodiment are also identified in the gaming device 1048 embodiment using the same reference numbers. Gaming device 1048 does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 1048.

Example gaming device 104B includes a main cabinet 116 including a main door which opens to provide access to the interior of the gaming device 1048. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the RNG 212 is a pseudo-RNG.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

One regulatory requirement for games running on gaming device 200 generally involves complying with a certain level of randomness (e.g., that outcomes will be statistically independent, uniformly distributed over their range, unpredictable and pass statistical tests such as chi-square test, equi-distribution test, gap test, runs test, serial correlation test, etc.). Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG 212 can be integrated into the game controller 202 or processor 204. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. (Gaming regulations may require that each reel outcome be independent of each other reel outcome, such that no reel outcome depends on any other reel outcome.) In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%).

A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

To meet a designated RTP, a game developer can utilize one or more lookup tables (e.g., weighted tables) to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. A game could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
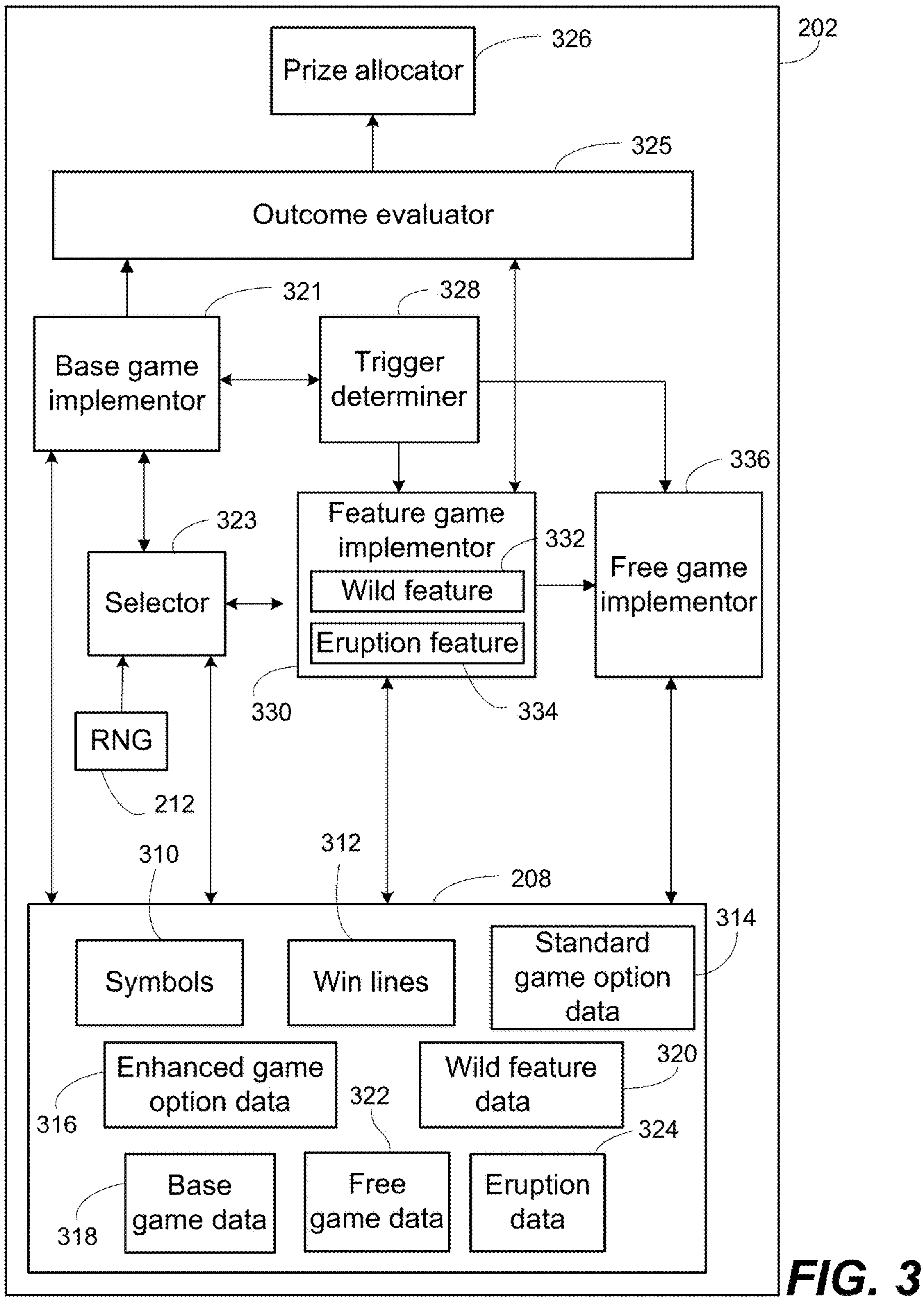
FIG. 3 is a block diagram showing functional components implemented by a game controller.

FIG. 3. illustrates a block diagram showing functional components implemented by the game controller 202. In this example, the functional components comprise data stored in the memory 208, including data indicative of symbols 310, data indicative of win lines 312, standard game option data 314 defining characteristics of a standard game option that in this example includes base games, feature games and free games, and enhanced game option data 316 defining characteristics of an enhanced game option that in this example includes base games, Wild features, eruption features and free games. The memory 208 may also include base game data 318 indicative of base games, Wild feature data 320 indicative of Wild features, free game data 322 indicative of free games and eruption data 324 indicative of eruption features implemented during the relevant standard or enhanced game options.

The functional components also include a base game implementer 321 arranged to implement base games according to a standard game option or an enhanced game option using the stored standard game option data 314 and the stored enhanced game option data 316. The base game implementer 321 uses a selector 323 to select symbols according to symbols data 310 for display at a plurality of display positions, for example using the RNG 212. Outcomes of a base game are determined by an outcome evaluator 325 and any applicable prize is awarded by a prize allocator 326.

During implementation of a base game by the base game implementor 321, the outcome evaluator 325 determines whether a base game outcome corresponds to a winning outcome, and the prize allocator 326 awards a prize according to the winning outcome and for example based on a base game pay table.

The functional components also include a trigger condition determiner 328 arranged to make a determination based on the outcome of an event during a base game as to whether to commence a feature or free game, for example based on whether a trigger condition has occurred during the base game such as selection and display of a defined combination of trigger symbols during the base game.

The functional components also include a feature game implementer 330, in this example that includes a Wild feature implementer 332 and an eruption feature implementer 334 arranged to implement Wild and eruption features using the stored Wild and eruption data 320, 324, and for example using the selector 323 to select symbols for display at a plurality of display positions and, depending on the feature, Wild symbol locations and Wild reel locations. Outcomes of a feature game are in this example also determined by an outcome evaluator and any applicable prize is awarded by the prize allocator 326.

The functional components also include a free game implementor 336 arranged to implement free games during the standard and enhanced game options.

During at least one base game, feature game and/or free game a sequence of games is implemented by the functional components, and at least one Wild symbol is added to a symbol display area during the games. At the start of each game, the displayed Wild symbols move, for example 1 position upwards. The added Wild symbol is persistent in that it remains in a symbol display area during at least one subsequent reel spin if the Wild symbol has not moved out of the symbol display area because of movement of the Wild symbol at the start of the game. If a Wild symbol is added to the display area and is selected to be displayed at a symbol location that has been moved into by a previously added Wild symbol, at least some symbol locations disposed immediately adjacent the location are converted to special Wild symbols, which greatly increases the likelihood of a winning outcome.

FIG. 4 illustrates an example of a set 400 of five reel strips 421, 422, 423, 424, 425 used during a game implemented by the game controller 202. In the example, each reel strip has fifteen reel strip positions 401-415. Each reel strip position of each reel has a symbol 430. Other reels strips similar to those illustrated in FIG. 4 can be used, for example the reel strips could have between 30 and 100 reel strip positions.

In the present example, the set 400 of reel strips do not initially include any Wild symbols, because an important aspect of the games implemented by the present gaming system is that Wild symbols are added during implementation of base and/or feature and/or free games, and an action during the base and/or feature and/or free games is triggered in response to occurrence of a newly added Wild symbol at the same location that has been moved into by a previously added Wild symbol. The co-location of the newly added wild symbol and the moved wild symbol provides an impression of a collision between two fireballs causing an explosion that spreads fireballs to nearby symbol locations.

The reel strips also include feature trigger symbols 436 that cause a feature to commence and/or free games to commence and/or be added when selected and displayed, in this example when defined a number of trigger symbols are displayed, such as 2 or 3 trigger symbols 436.

Figure 5:
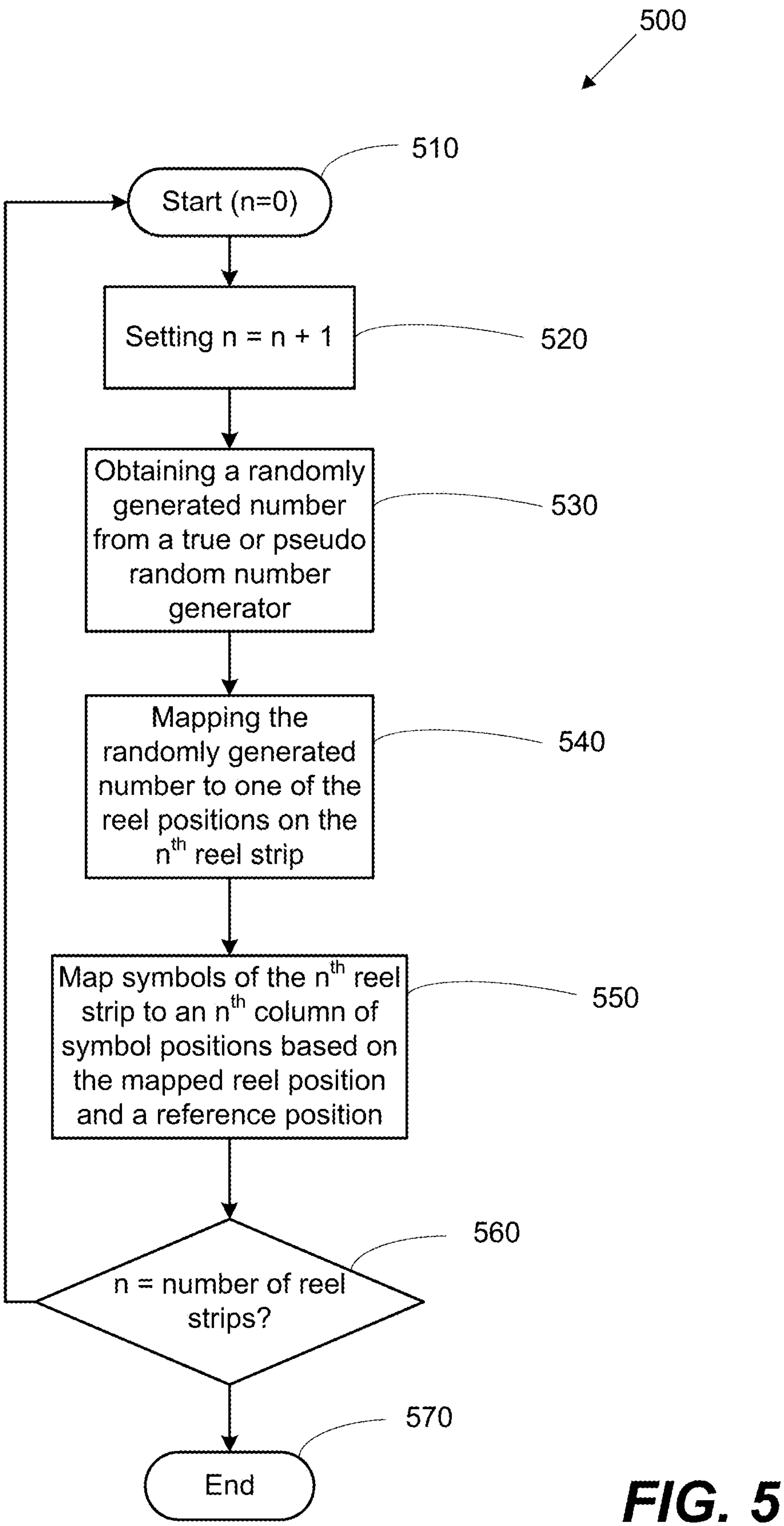
FIG. 5 is a flow chart of an example symbol selection method.

FIG. 5 is a flow chart of a method 500 carried out by the processor 204 to select symbols from reel strips. At step 510, the processor 204 starts the process of selecting symbols with a counter (n) set at zero as symbols have not yet been selected from any reel strips. At step 520, the processor 204 increments the counter. In the first iteration, the counter is set to 1 to reflect that symbols are to be selected from a first reel strip. At step 530 the processor obtains a randomly generated number from a true or pseudo-RNG 212. At step 540 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 550, the processor 204 maps symbols of the $n^{th}$ reel strip to the $n^{th}$ column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 4, if the value returned by the RNG 212 is mapped to reel position 413, then for the first reel strip 421, "Pic3" symbol 443 is mapped to a bottom symbol position, "10" symbol 442 is mapped to a middle symbol position, and "J" symbol 441 is mapped to a top symbol position.

At step 560, the processor 204 determines whether symbols have been selected for all of the reel strips, and if not the processor reverts to step 520 and iterates through steps 530, 540 and 550 until it is determined at step 560 that symbols have been selected from all n reel strips and mapped to all n columns of symbol positions after which the symbol selection process ends 570. Different numbers of symbols may be mapped to different numbers of symbol positions.

After the symbols of all reel strips have been mapped to symbol position, the processor 204 controls display 240 to display them at the symbol positions.

Example embodiments will now be described with reference to FIGS. 6 to 33 of the drawings.

Figure 6:
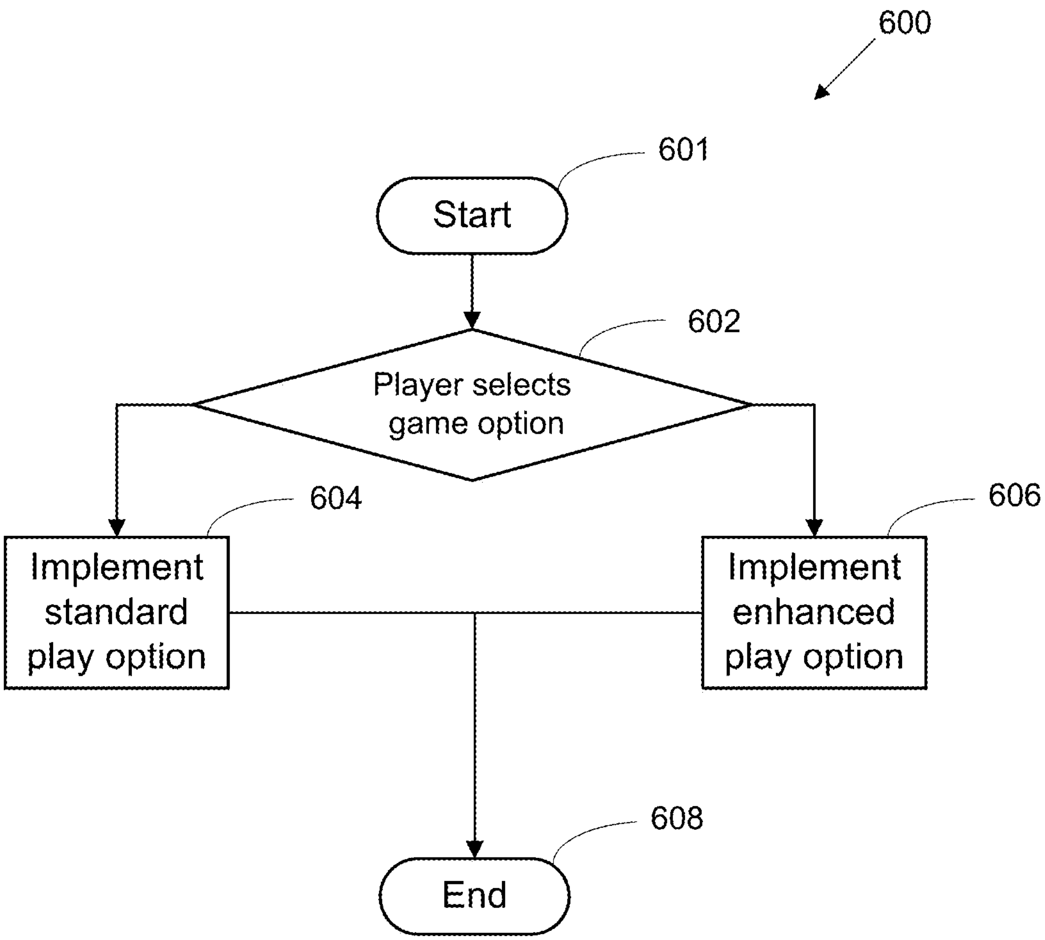
FIG. 6 is a flow chart illustrating an example game play option selection process of an example method of gaming.

FIG. 6 shows a flow chart 600 illustrating steps 601 to 608 of an example game implementation wherein a player is able to select from multiple play options. In this example, the player is able to select a standard play option 604 or an enhanced play option 606, the enhanced play option providing functionality similar to the functionality of the standard play option but also including additional functionality, in this example including additional features and animations whereby a character on the game display interacts with the game. In this example, the enhanced play option requires a credit entry bet that is larger than the credit entry bet required for the standard play option, for example twice the credit bet required for the standard play option.

In this example, multiple bet options are available that are configurable by a player. For example, the gaming system may be arranged to facilitate selection by the player of the number of possible bet multipliers, such as 2, 3 or 5 bet multipliers, and the number of lines in play.

During at least some games implemented by the gaming system, a sequence of games is implemented wherein for each game a determination is made as to whether to add at least one Wild symbol to a symbol display area and the number of Wild symbols to add. The added Wild symbols are persistent in that they remain in the display area during subsequent selections of symbols until moved out of the display area because of movement of the Wild symbols. If a Wild symbol is added to the display area and is selected to be displayed at a display area location that has been moved into by a previously added Wild symbol, at least some symbol locations disposed immediately adjacent the location are converted to special Wild symbols that unlike the added Wild symbols are not persistent.

Figure 7:
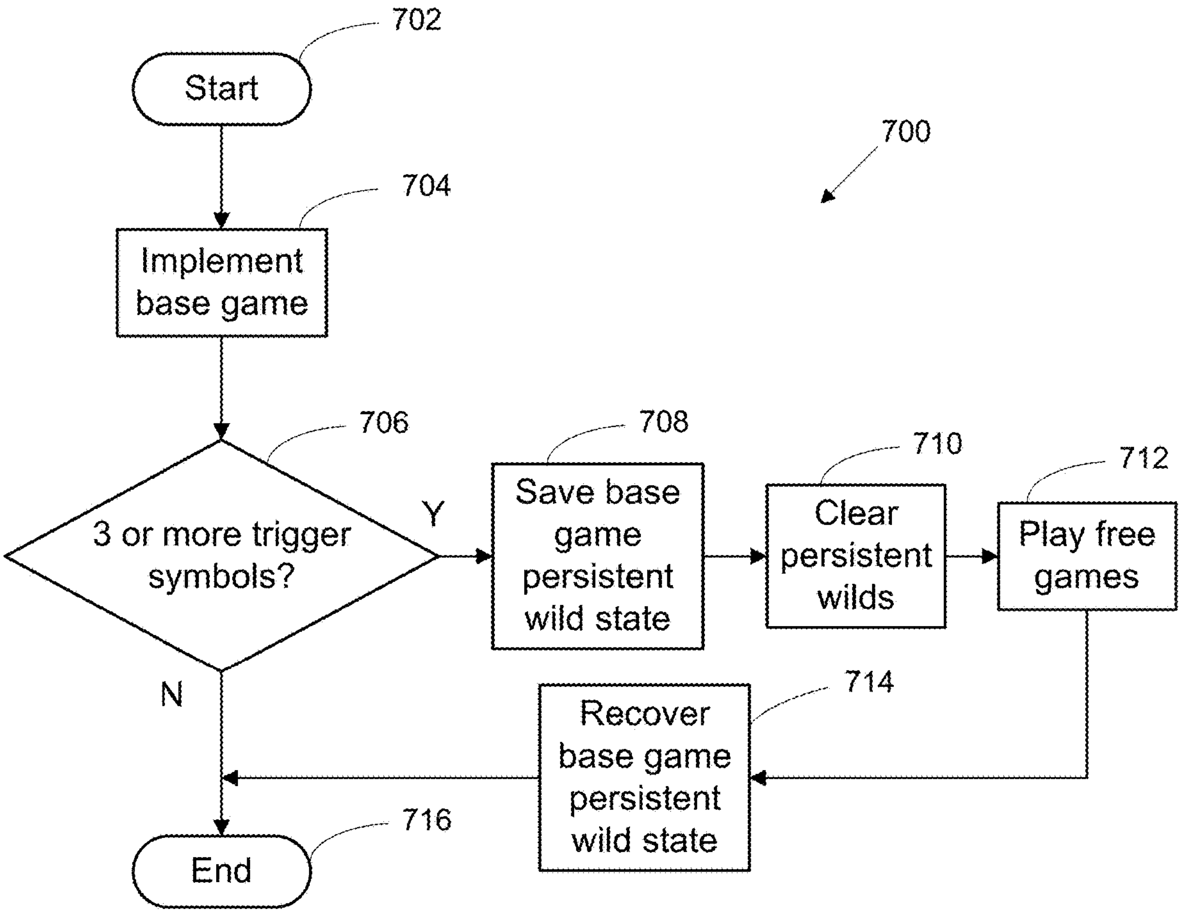
FIG. 7 is a flow chart illustrating an example implementation process of a standard game play option.

If the standard play option is selected by the player, the flow chart 700 shown in FIG. 7 is implemented, the flow chart 700 illustrating steps 702 to 716 of an example implementation process of the standard game play option. The standard game play process involves implementing a base game 704 with Wild feature, described in more detail in relation to FIG. 8, and implementing a free game feature with Wild feature, described in more detail in relation to FIGS. 9 and 10.

Referring to FIG. 7, during implementation of a base game, if a trigger condition occurs 706, in this example selection and display of multiple (for example 3) trigger symbols 436 in a display area, one or more free games are implemented 712. In this example, the same symbol set 400 is used for the free games as the base game. However, prior to implementing the free game(s), any persistent Wild symbols that are present are removed 710, with the locations of the persistent Wild symbols being saved 708 and subsequently recalled 714 after completion of the free games.

Figure 8:
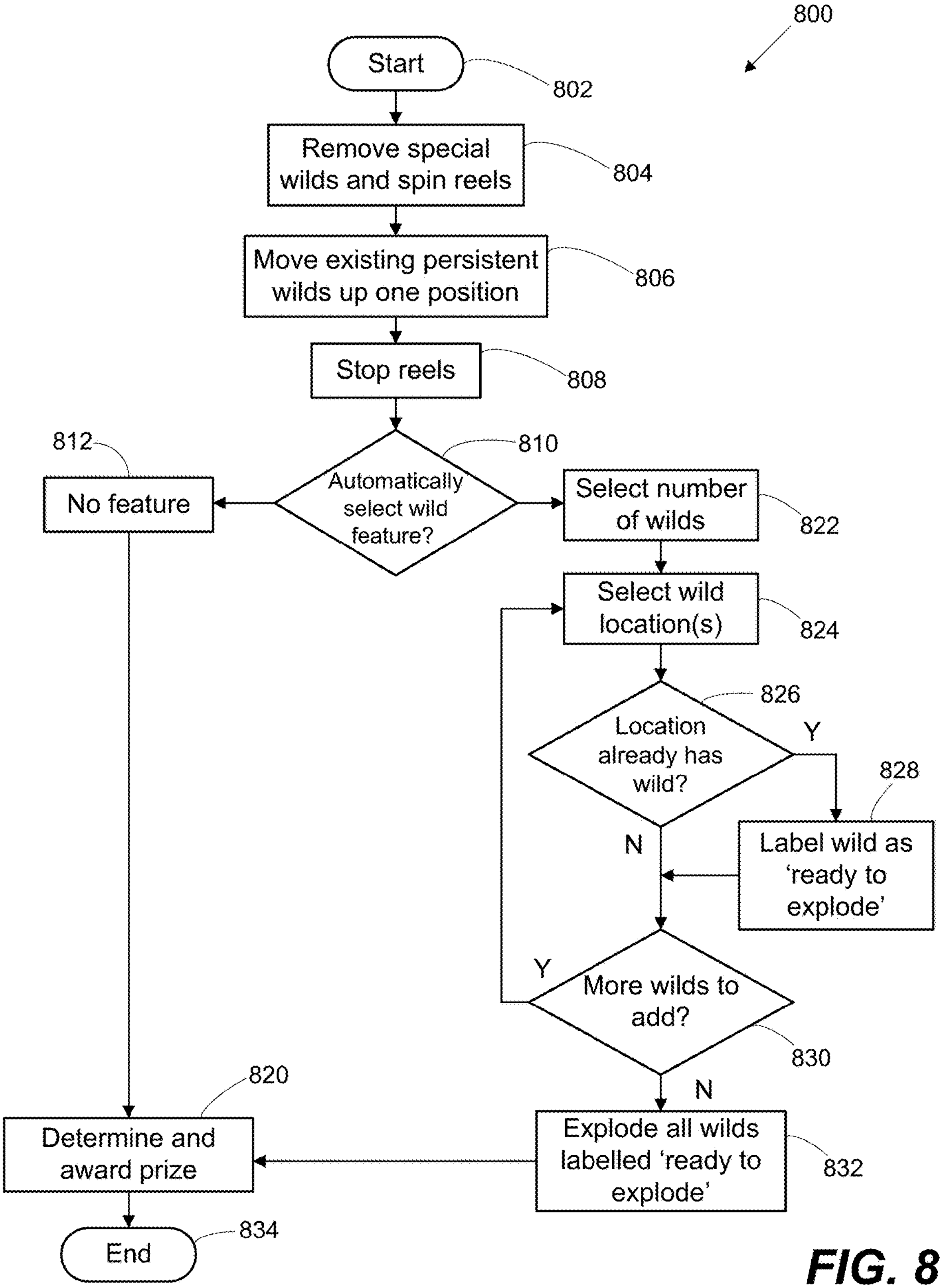
FIG. 8 is a flow chart illustrating an example implementation of a base game of the standard game play option.

FIG. 8 shows a flow chart 800 illustrating steps 802 to 834 of an example implementation of the base game of the standard game play option 604.

Prior to each base game, any special Wild symbols that are present in the display area, for example because they have been added in response to occurrence of 2 persistent Wild symbols at the same location, are removed 804.

Figure 17:
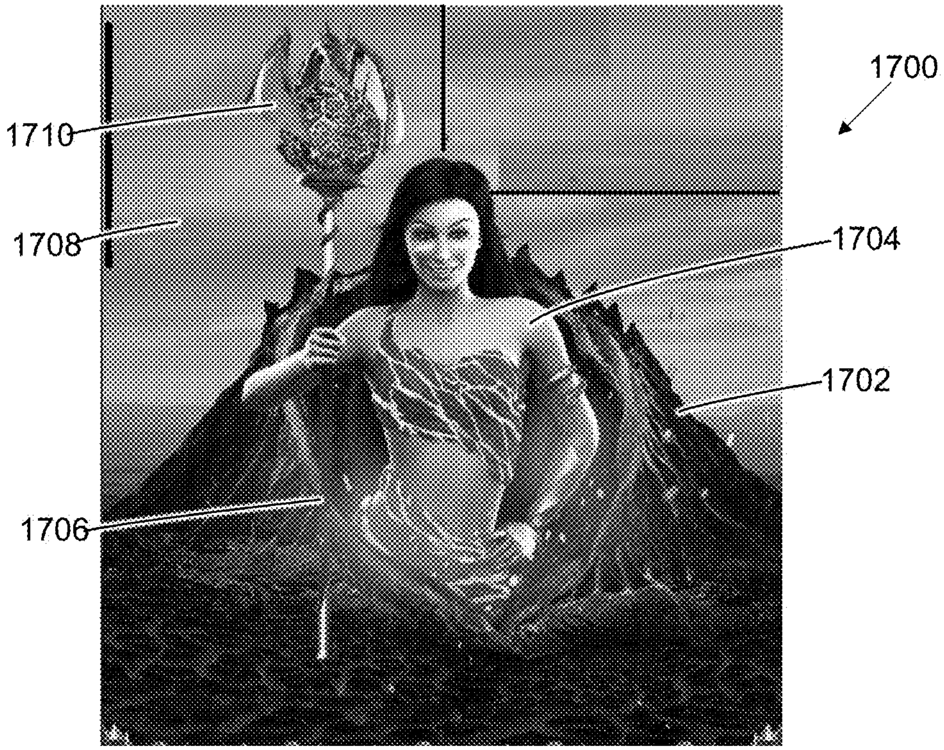
FIG. 17 is a representation of a background screen displayed by the gaming system to a player during the standard game play option.

A representation of a background scene 1700 displayed by the gaming system to a player during the standard game play option is shown in FIG. 17. The background scene 1700 in this example includes a representation of a volcano 1702, a representation of the sky 1708, and a representation of a character 1704 disposed inside the volcano 1702. In this example, the character includes a scepter 1706. During implementation of the standard game play option, the representations of the volcano 1702 and the sky 1708 in the background scene 1700 do not change according to the game state.

Prior to and during implementation of base games, a continuous attract loop is carried out whereby the character 1704 and/or the volcano 1702 animates for the purpose of attracting players. When the gaming system is in a playable state, that is, when credit is on the credit meter, the attraction animation may be replaced, for example randomly, with an anticipation animation wherein the character animates in a different way than it does during the attraction animation. For example, when the gaming system is in a playable state, the gaming system may apply a 1 in 50 chance that the character anticipation animation will occur. Similarly, the volcano 1702 may have different animation types according to the game state that include at least one attraction animation and at least one anticipation animation.

In addition to the attract and anticipation animations, the gaming device 200 may emit light that is configured and coordinated according to the game state, for example such that edge lighting of the gaming device 200 is different during display of the attract and anticipation animations.

Figure 18:
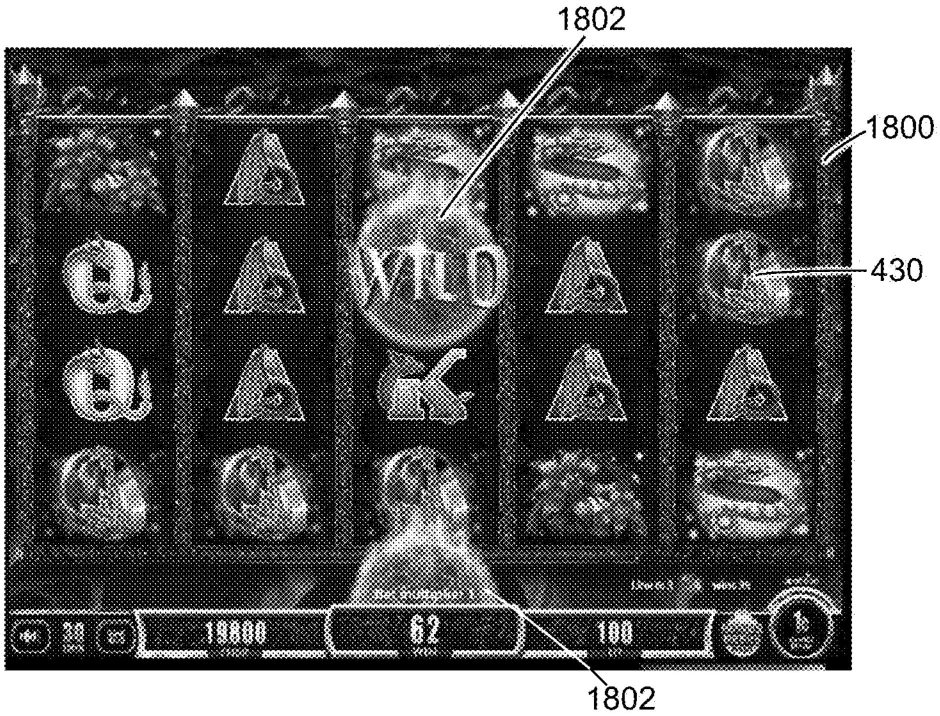
FIG. 18 is a representation of a base game screen displayed to a player during implementation of a base game in the standard game play option.
Figure 19:
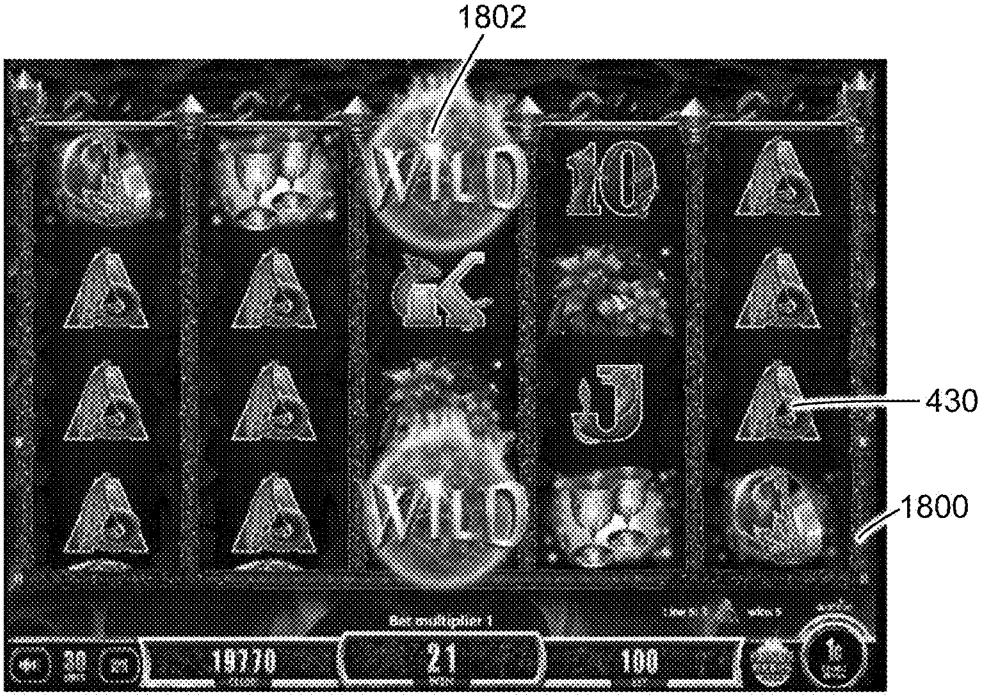
FIGS. 19 to 22 are representations of a base game screen displayed to a player during implementation of a wild feature of the base game of the standard game play option.

An example display area 1800 of a gaming system during implementation of a base game is shown in FIGS. 18 and 19, the display area 1800 showing symbols including standard symbols 430, potentially trigger symbols 436 that have been selected for display in the display area 1800, and any existing Wild symbols 1802 that have been added in a previous base game and remain persistent in the current game.

As shown in FIGS. 18 and 19 and represented at step 806 of the flow chart 800 shown in FIG. 8, at the start of each base game, the displayed Wild symbols 1802 are moved relative to the display area 1800. In this example, each displayed Wild symbol 1802 moves 1 position upwards elative to the display area 1800, although it will be understood that the gaming system may be arranged to move the displayed Wild symbols in a different way, for example the displayed Wild symbols 1802 may move multiple display positions, a randomly selected number of display positions and/or in a direction that is different to upwards. Wild symbol movement allows additional wild symbols to be introduced and, after a number of spins, removed. This momentary persistence of wild symbols temporarily increases the near-term RTP, while marginally increasing the long-term RTP, keeping the expected RTP within predetermined levels.

As shown in FIG. 18, in this example it is possible to also add a Wild symbol 1802 to a location outside the display area 1800 with the external Wild symbol 1802 moving to a location inside the display area 1800 in a subsequent base game (shown at the bottom center of display 1800 in this particular example). Similarly, a Wild symbol 1802 that is located at an uppermost display area location will move out of the display area 1800 in a subsequent base game, but unlike Wild symbols that are added to and displayed at a location below the display area, a Wild symbol 1802 disposed at an uppermost location of the display area 1800 is removed and therefore not displayed at all in a subsequent base game.

It will be understood that enabling Wild symbols 1802 to be added to locations outside the display area 1800 creates more locations that are able to receive Wild symbols 1802 in addition to the display positions of the display area, which increases utilization of the display. Adding Wild symbols 1802 to a location outside the display area 1800 with the expectation that the Wild symbols 1802 outside the display area 1800 will subsequently move into the display area also enhances player anticipation. Adding Wild symbols to a location outside the display area 1800 also effectively increases the number of spins for which the outside Wild symbols are persistent since the Wild symbols that initially appear outside the display area 1800 are present on the screen for N+1 spins, where N is the number of rows of symbols in the display area.

After movement of the existing persistent Wild symbols 1802 has occurred, the reels are caused to stop rotating 808 in order to display a new set of symbols 430, 436, and the game controller 202 then makes a determination 810 as to whether a Wild feature will be implemented wherein at least one new Wild symbol 1802 is added to the display area 1800.

In this example, if the determination is that a Wild feature will not be implemented 812 for the current base game, the gaming system determines whether the selected symbols displayed in the display area 1800 correspond to a winning outcome, taking into account the persistent Wild symbols 1802 currently displayed in the display area 1800.

In this example, if the determination 810 is that a Wild feature will be implemented for the current base game, the game controller 202 automatically selects 822 a number of Wild symbols 1802 to be added and automatically selects 824 the locations in or below the display area 1800 that will receive the Wild symbols 1802. The game controller 202 then causes an add Wild animation to be displayed, in this example wherein a metamorphic fireball is shown to be expelled from the volcano 1702 and to move along a path towards the display area location selected for the Wild symbol 1802. The animation(s) for the fireball(s) corresponding to the added Wild symbol(s) 1802 may be timed such that each fireball lands at the same time or just before the relevant reel that includes the selected location stops. In this example, the game controller 202 is arranged such that, for any base game, if multiple Wild symbols are added then 2 Wild symbols cannot be added to the same location at the same time.

When a Wild symbol 1802 lands in the display area 1800, the word WILD is added to the fireball after the fireball has landed. If the fireball lands outside the display area 1800, the word WILD is not added to the fireball, but is added to the fireball when the fireball subsequently moves to a location inside the display area 1800.

Figure 20:
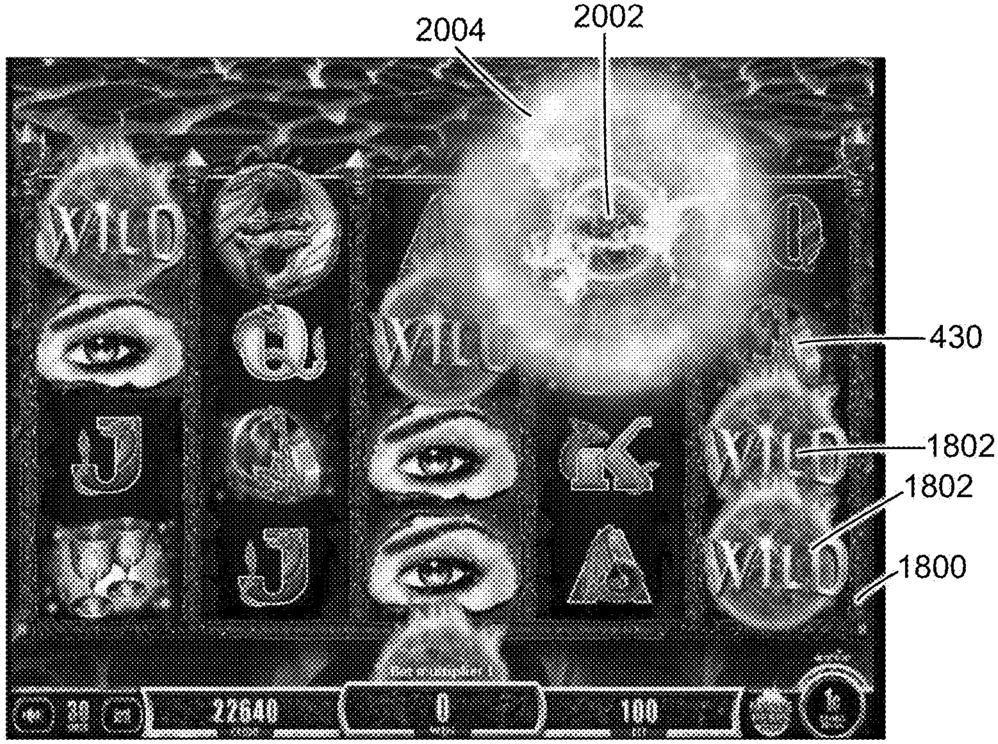
Figure 21:

As shown in FIG. 20, if the new Wild symbol 1802 is determined at step 826 to be added to a location that already includes a persistent Wild symbol added in a previous base game, then an animation is displayed to indicate at step 828 that the Wild symbols 1802 at the display location are ready to explode. For example, as shown in FIG. 20, the 'ready to explode' Wild symbol 2002 may include a surrounding energy halo 2004. After it is determined at step 830 that all new Wild symbols have been selected and have landed onto or below the display area 1800, all locations that now have 2 Wild symbols 'explode' and cause at step 832 at least some, in this example all, immediately adjacent symbols 430 to change to special Wild symbols 2102, as shown in FIG. 21. Special Wild symbols 2102 have a similar appearance to the added Wild symbols 1802, but that unlike the added Wild symbols 1802, the special Wild symbols 2102 are not persistent in that they are removed after completion of each base game.

In this example, in order to avoid confusing the player as to which symbols cause an explosion or whether an exploded Wild symbol has itself caused another Wild symbol 1802 to explode, the timing of the explosions is managed such that when a new Wild symbol is added to the same display location as an existing Wild symbol 1802 that has moved into the display location, instead of immediately exploding, the display location is marked as 'ready to explode' and provided with a 'ready to explode' animation. After addition of all Wild symbols 1802, the relevant 'ready to explode' Wild symbols are then caused to explode at the same time.

A determination 820 is then made as to whether a prize is applicable for the displayed symbols taking into account the added Wild symbols 1802 and the special Wild symbols 2102, and if so a prize is awarded.

Figure 22:
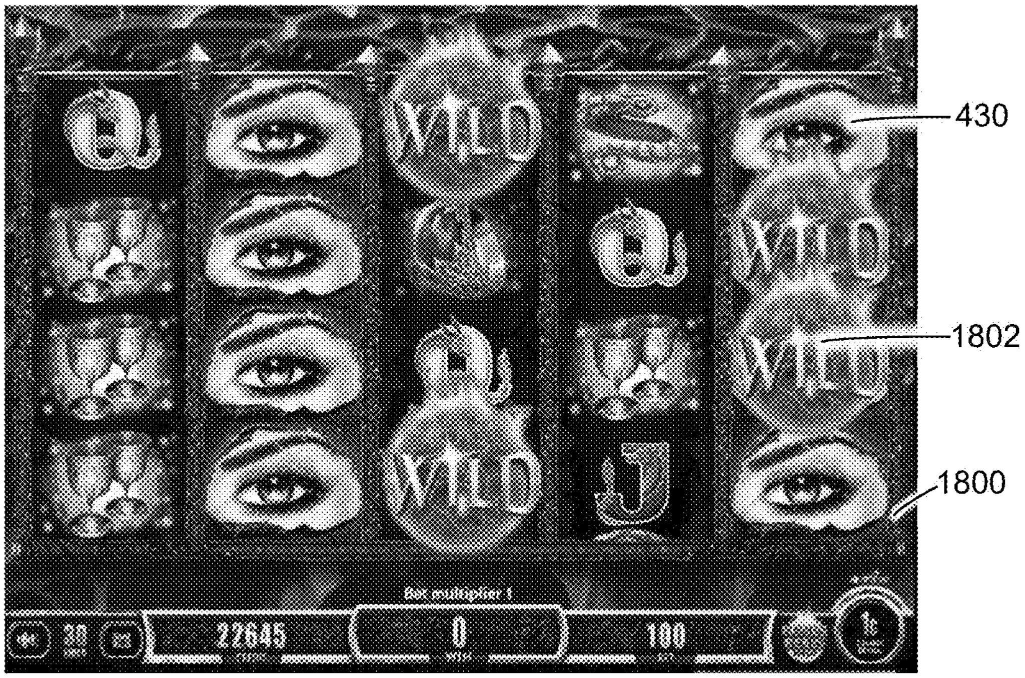

As shown in FIG. 22, after completion of a base game and prior to implementation of a subsequent base game, any special Wild symbols 2102 that have been added are removed. As shown, at the start of the subsequent base game, the displayed persistent Wild symbols 1802 move 1 position upwards such that a Wild symbol previously located outside the display areal 800 is now located inside the display area 1800, and a Wild symbol 1802 previously located at an uppermost location in a first reel has moved out of the display area 1800 and has therefore been removed.

Figure 23:
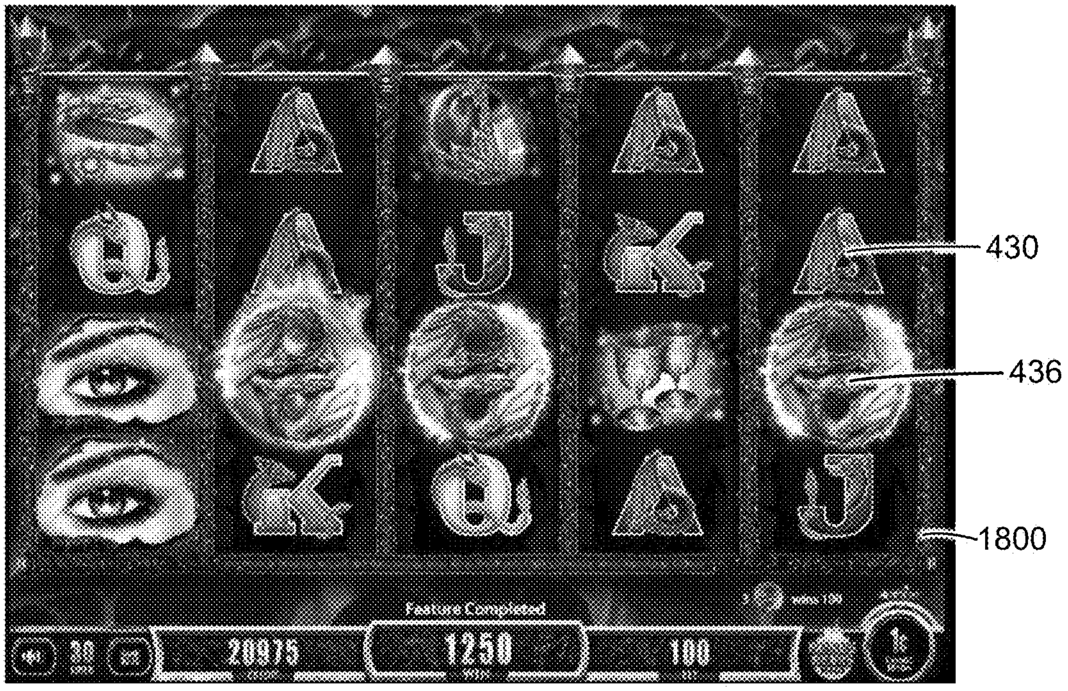
FIG. 23 is a representation of a base game screen displayed to a player during implementation of a base game in the standard game play option and showing a trigger condition used to trigger a free game feature.

As shown in FIG. 7, if during implementation of a base game a trigger condition occurs 706, for example selection and display of 3 or more defined trigger symbols 436 as shown in FIG. 23, a free game feature is implemented.

In this example, if a fireball lands at a location in the display area 1800 that includes a trigger symbol 436, and at least some reels are still spinning such that it is still possible to obtain a trigger condition, display of the trigger symbol takes precedence over display of the added Wild symbol 1802. However, when it is no longer possible to obtain a trigger condition, display of the Wild symbol 1802 takes precedence over display of the trigger symbol 436. Alternatively, the trigger symbol 436 and the added Wild symbol 1802 may be displayed alternately.

Figure 9:
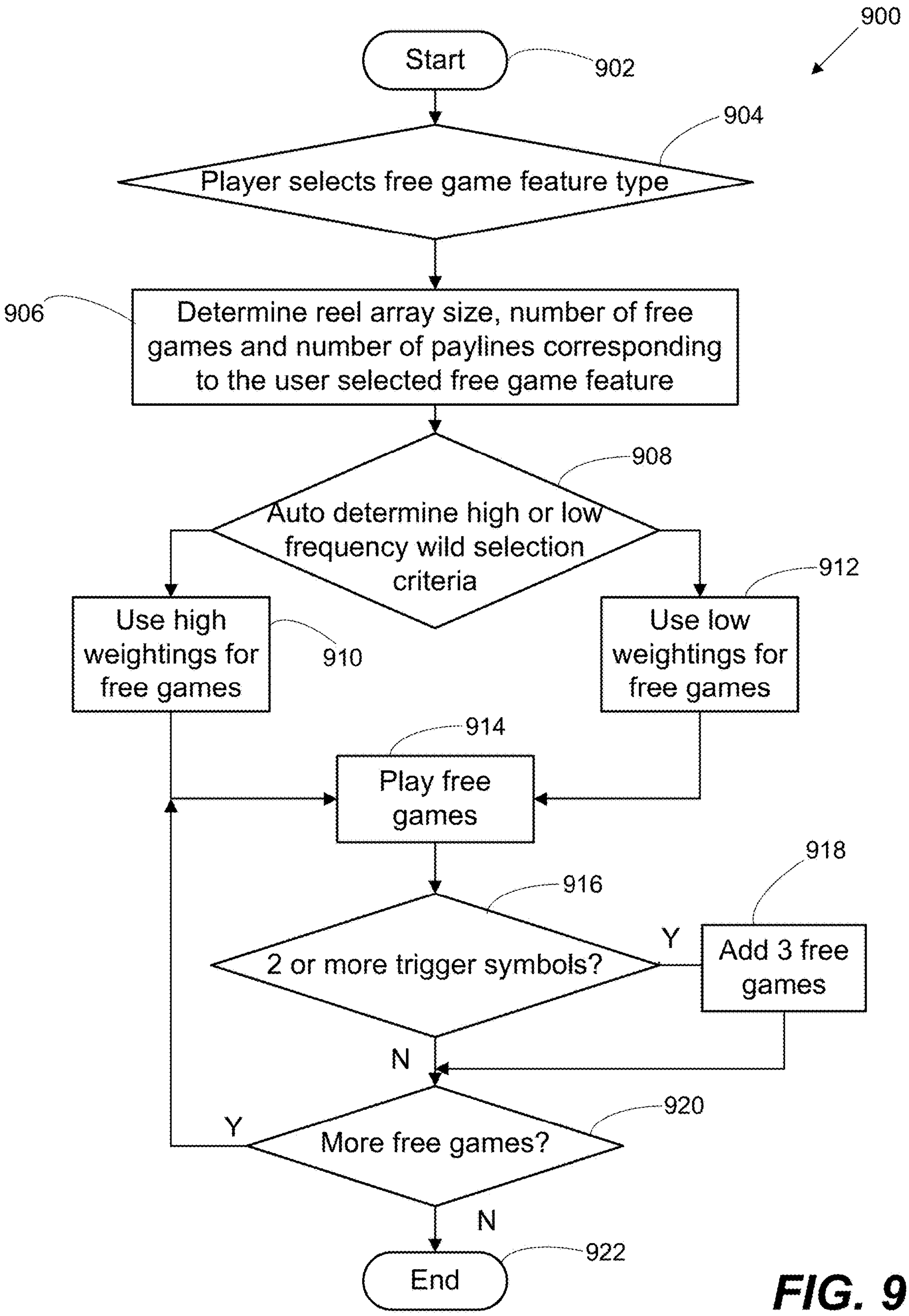
FIG. 9 is a flow chart illustrating an example implementation of a free game feature of the standard game play option.
Figure 24:
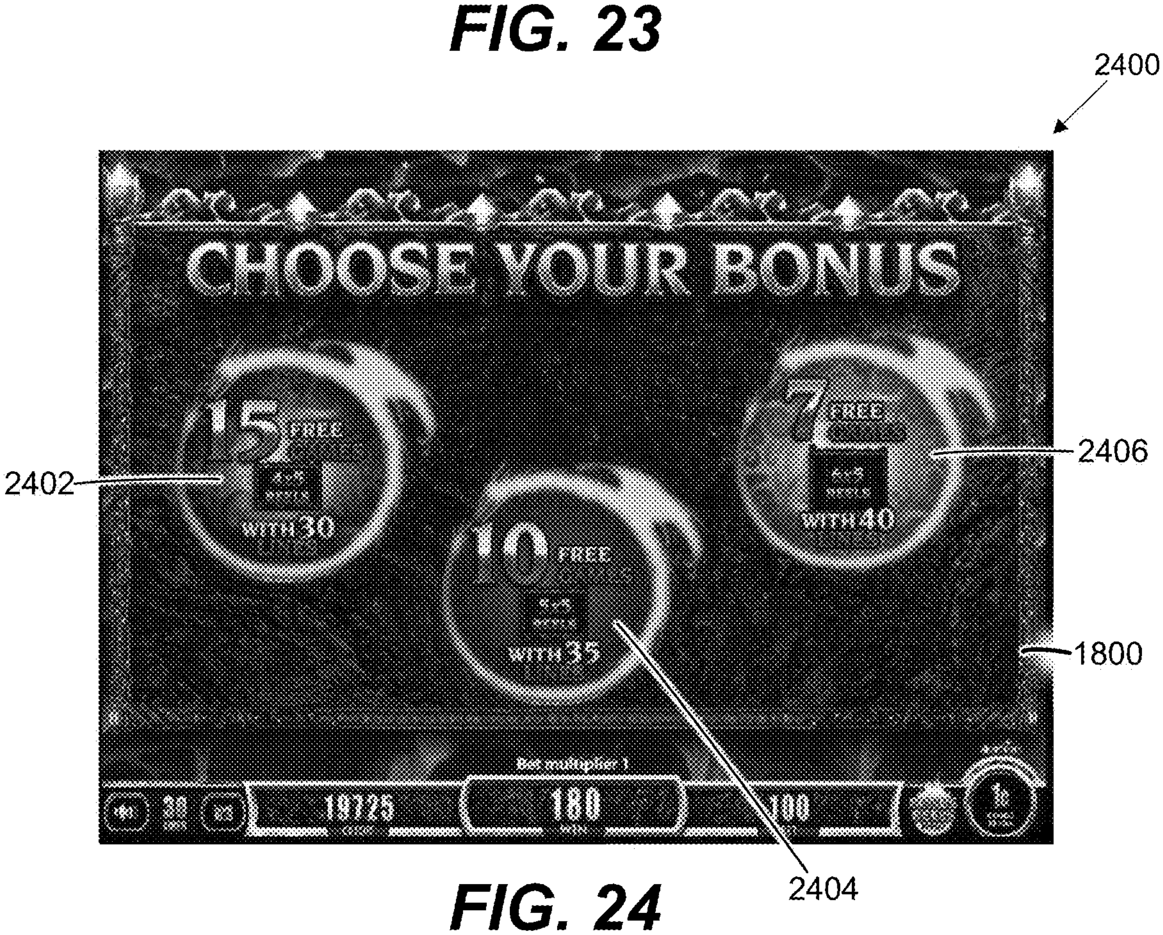
FIG. 24 is a representation of a free game selection screen displayed to a player during implementation of a base game after a free game trigger condition has occurred.

FIG. 9 shows a flow chart 900 illustrating steps 902 to 922 of an example implementation of a free game feature. After triggering the free game feature, a free game type selection screen 2400 is displayed as shown in FIG. 24 wherein a player is provided with the option 904 of selecting from several types of free game feature. As shown in FIG. 24, in this example, the available free game feature types are 15 free games 2402 with 4×5 reels and 30 lines, 10 free games 2404 with 5×5 reels and 35 lines or 7 free games 2406 with 6×5 reels and 40 lines, although it will be understood that any suitable type of free game is envisaged.

After selection of the free game type by the player, the game controller 202 configures 906 the parameters for the free games based on the player selection, and automatically selects 908 high or low weightings to be used when selecting the number of Wild symbols to be added in the free games. High weighting is more likely to cause more Wild symbols to be added to the display area than the low weighting.

The required number of free games for the selected free game type are then implemented 914.

Figure 25:
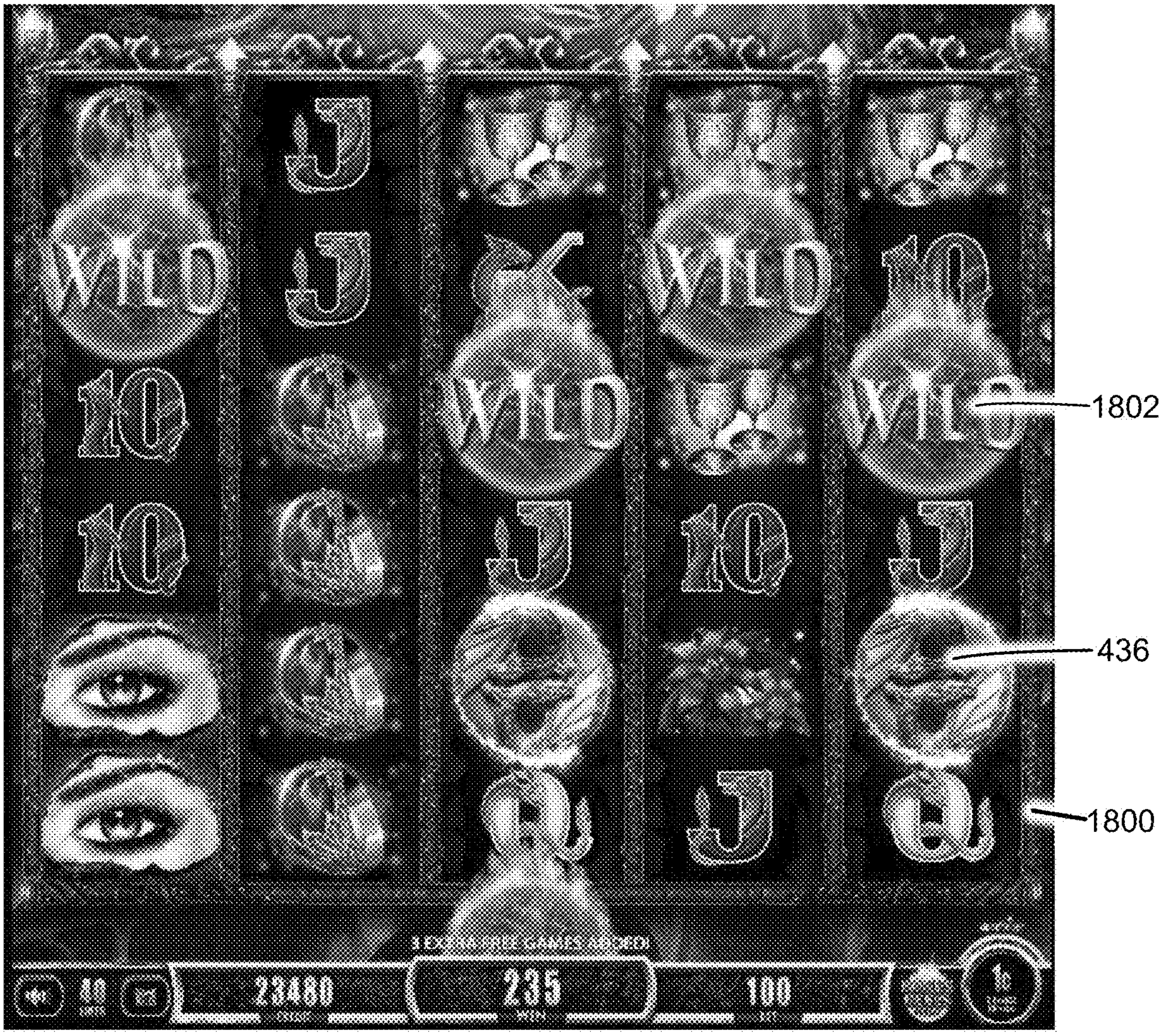
FIG. 25 is a representation of a screen displayed to a player during implementation of a free game of the base game of the standard game play option and showing an additional free game trigger condition.

In this example, the selected free game feature includes 7 free games with 6×5 reels and 40 lines, as shown in FIG. 25, and as such the display area 1800 transitions to a 6×5 symbol array whilst the reels are spinning.

If a special trigger occurs 916 during implementation of a free game, in this example display of 2 or more trigger symbols 436 in the display area as shown in FIG. 25, additional free games are added at step 918, in this example 3 free games. When all free games are determined at step 920 to have been exhausted, the free game feature terminates at step 922.

Figure 10:
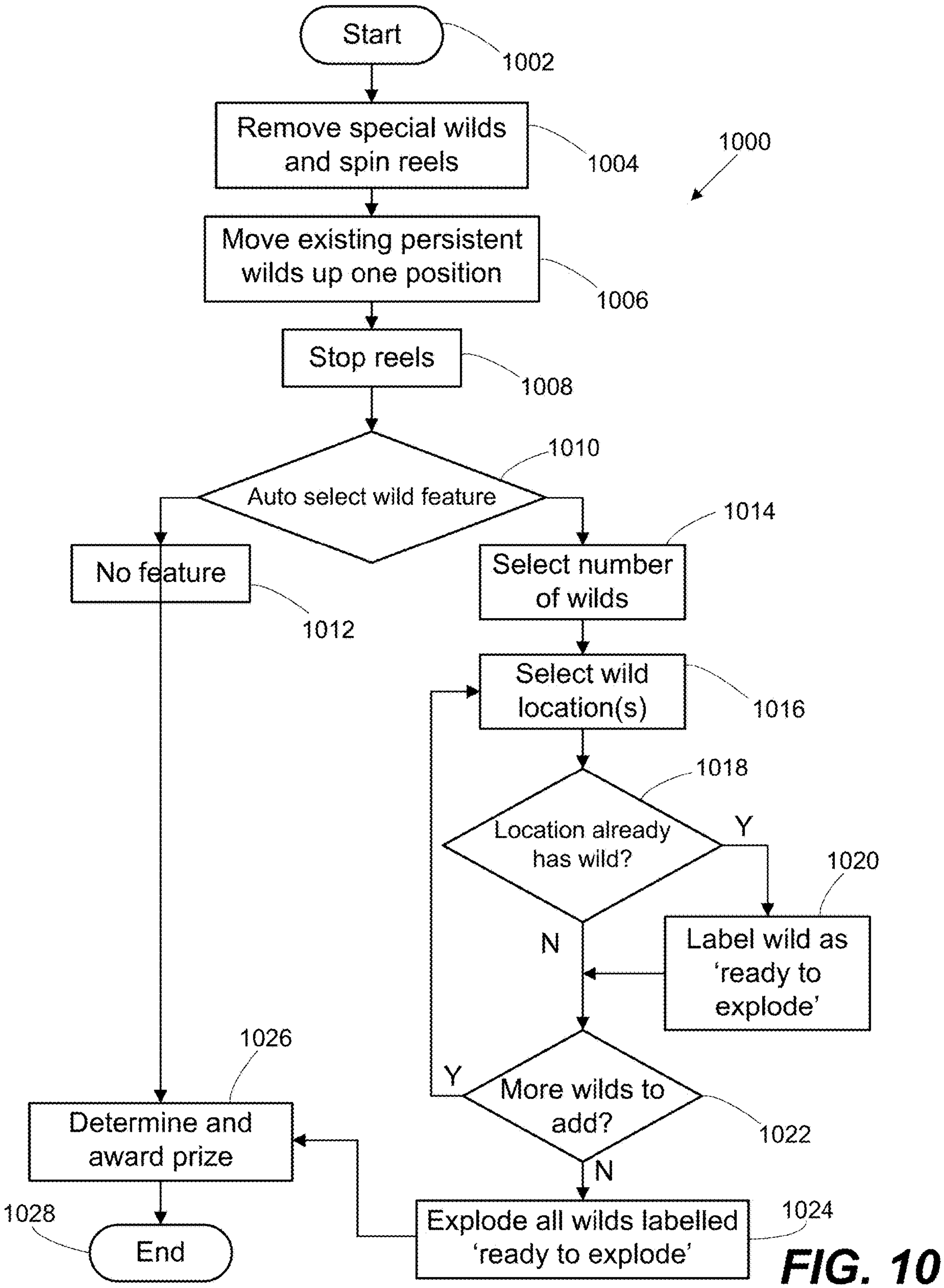
FIG. 10 is a flow chart illustrating an example implementation of a free game of the free game feature shown in FIG. 9.

FIG. 10 shows a flow chart 1000 illustrating steps 1002 to 1028 of an example implementation of a free game of the free games feature.

For each free game, steps are carried out to remove 1004 any special Wild symbols that have been previously added, for example because an added Wild symbol has previously exploded, and any persistent Wild symbols that have been added during a previous free game are moved 1006, in this example upwards one display position.

Operation of the free games is similar to operation of the Wild feature during a base game illustrated in FIG. 8, except that with the free games different Wild weightings are used according to a randomly selected high or low weightings table. It will also be understood that with the free game types that include larger arrays of symbols, the added Wild symbols can persist in the display area for longer since a greater number of displayed symbols exist in each reel.

After movement 1006 of the existing persistent Wild symbols 1802 has occurred, the reels are caused to stop rotating 1008 in order to display a new set of symbols. The game controller 202 then makes a determination 1010 as to whether a Wild feature will be implemented.

If the determination is that a Wild feature will not be implemented 1012 for the current free game, a determination is made 1026 as to whether the selected symbols displayed in the display area correspond to a winning outcome, taking into account any persistent Wild symbols 1802 currently displayed in the display area 1800 that have been added in a previous free game, and if so a prize is awarded.

In this example, if the determination is that a Wild feature will be implemented for the current free game, the game controller 202 automatically selects the number of Wild symbols to be added 1014 and automatically selects the locations 1016 in or below the display area that will receive the Wild symbols 1802. The game controller 202 then causes an add Wild animation to be displayed, in this example wherein a metamorphic fireball is shown to be expelled from the volcano and to move along a path towards the display area location selected for the Wild symbol 1802. The animation(s) for the fireballs corresponding to the added Wild symbols may be timed such that the fireballs land at the same time or just before the relevant reel that includes the location stops. In this example, the game controller 202 is arranged such that for each free game if multiple Wild symbols are added then 2 Wild symbols cannot be added to the same location.

When a Wild symbol lands in the display area 1800, in this example an animation is displayed that concludes by adding the word WILD to the fireball. As with the Wild feature shown in FIG. 20, if it is determined at step 1018 that the new Wild symbol is added to a location that already includes a persistent Wild symbol added in a previous free game, then an animation is displayed at step 1020 to indicate that the Wild symbols at the display location are ready to explode. After it is determined at step 1022 that all new Wild symbols have been selected and have landed onto or below the display area, all locations that now have 2 Wild symbols 'explode' 1024 and cause at least some, in this example all, immediately adjacent symbols 430 to change to special Wild symbols 2102. Special Wild symbols 2102 have a similar appearance to the added Wild symbols 1802 except that unlike the added Wild symbols, the special Wild symbols 2102 are not persistent in that they are removed after completion of the free game.

After each free game, a determination is made 1026 as to whether a prize is applicable for the displayed symbols taking into account the added Wild symbols 1802 and the special Wild symbols 2102, and if so a prize is awarded 1026.

After implementation of all free games, the game controller 202 reverts to implementation of a base game shown in FIG. 7 and the state of persistent Wild symbols at the time of triggering the free game feature is recalled 714 so that the player can continue playing base games.

Figure 11:
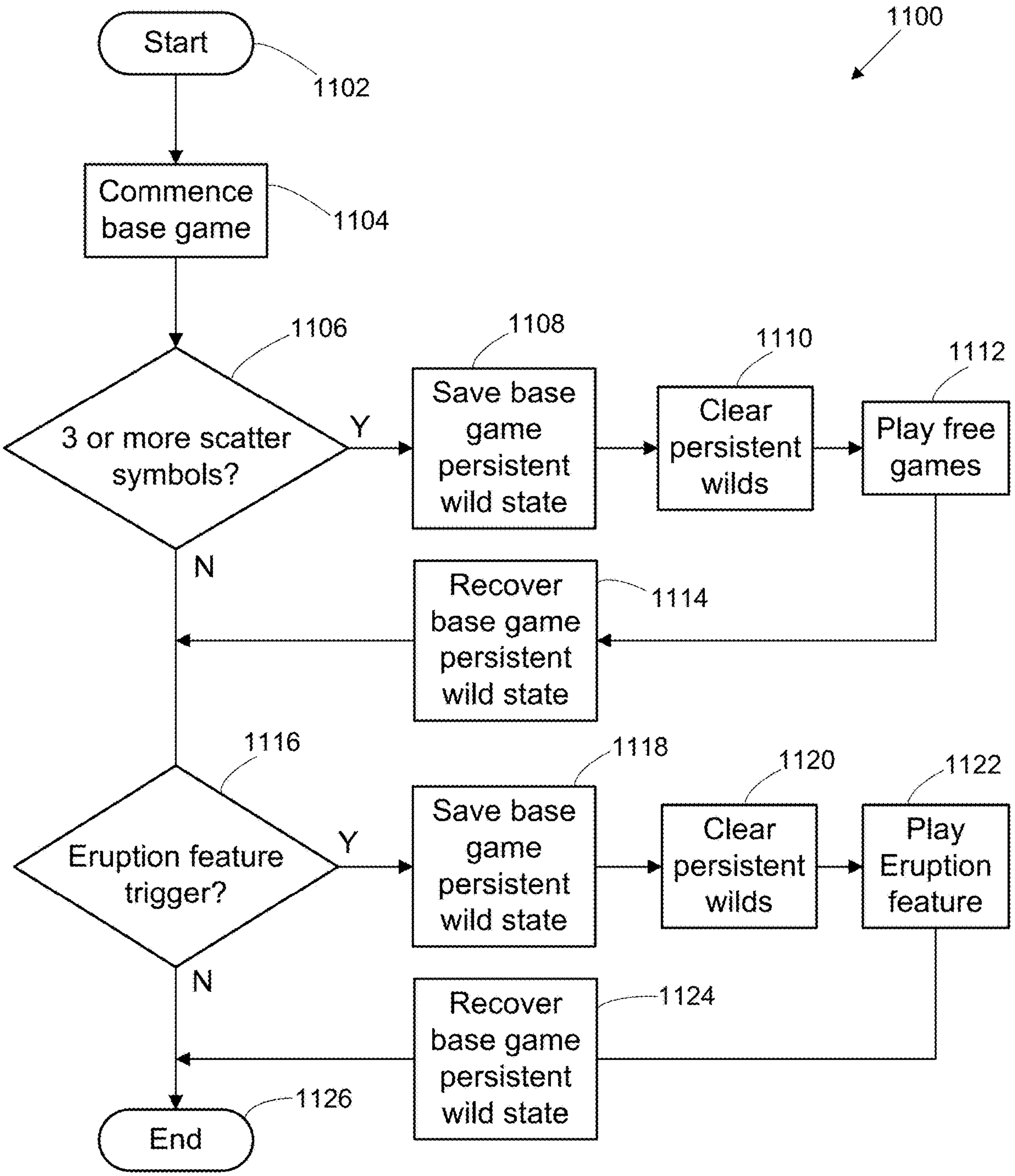
FIG. 11 is a flow chart illustrating an example implementation process of an enhanced game play option.

Referring to FIG. 6, if the enhanced play option is selected by the player, the flow chart 1100 shown in FIG. 11 is implemented, the flow chart 1100 illustrating steps 1102 to 1126 of an example implementation process of the enhanced game play option. The enhanced game play process involves implementing a base game 1104 described in more detail in relation to FIGS. 12 and 13.

Referring to FIG. 11, during implementation of a base game, if a trigger condition occurs 1106, in this example display of multiple (for example 3) trigger symbols 436, a free game feature is implemented that includes implementation 1112 of one or more free games. However, prior to implementing the free game(s), any persistent Wild symbols 1802 that are present are removed 1110, with the locations of the persistent Wild symbols 1802 being saved 1108 and subsequently recalled 1114 after completion of the free games.

Figure 12:
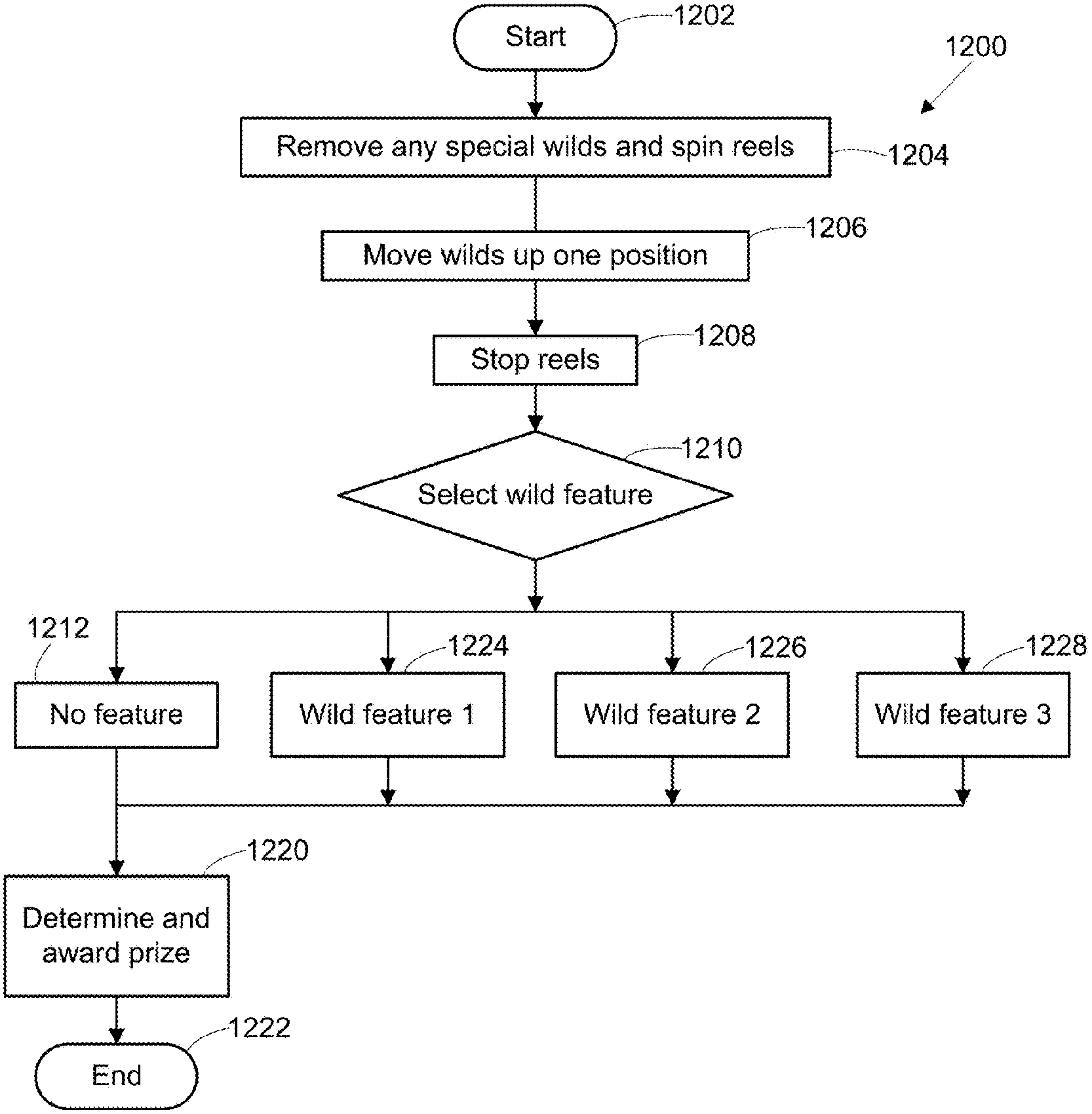
FIG. 12 is a flow chart illustrating an example implementation of a base game of the enhanced game play option.
Figure 13:
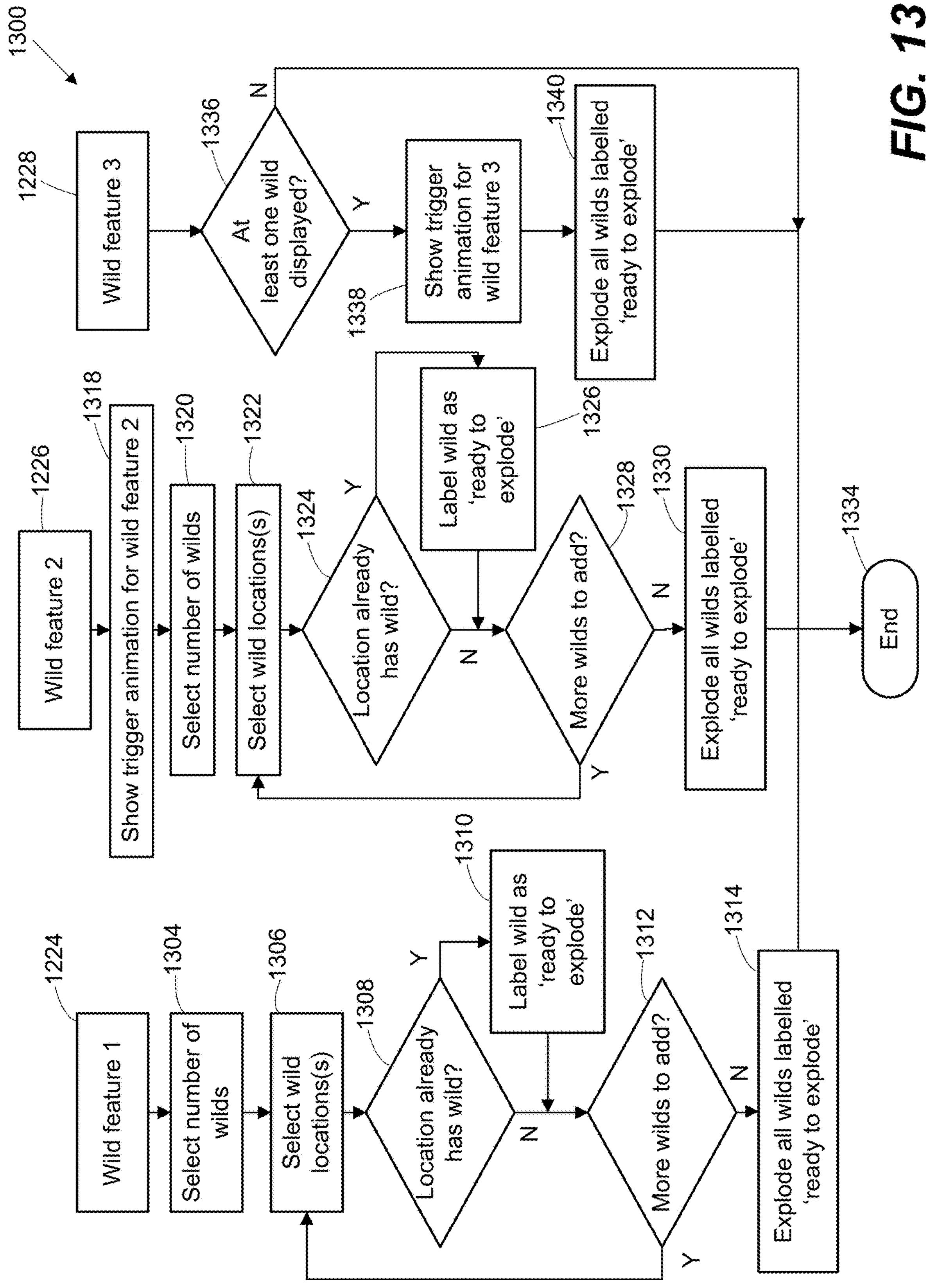
FIG. 13 is a flow chart illustrating an example implementation of wild features available in the base game of the enhanced game play option shown in FIG. 12.

FIGS. 12 and 13 show flow charts 1200 and 1300 illustrating steps 1202 to 1228 and 1302 to 1340 respectively of an example implementation of the base game of the enhanced game play option 606.

During the base game of the enhanced game play option 606, a similar background scene to the standard play option background scene 1700 shown in FIG. 17 is used. However, with the enhanced game play option 606, the background scene has multiple states, for example 5 states, that are displayed according to game play, for example according to the amount of game play for a player, or the status of the game implemented by the game controller 202. For example, the background scene states may differ in that the volcano 1702, the character 1704, the scepter 1706 and/or the sky 1708 change in a defined way, for example change color as the number of games played increases, or according to the current game state.

In this example, as the amount of game play increases, the state of the background scene increments with increasing game play, and therefore the color of the volcano 1702, the scepter 1706 and the sky 1708 changes such that the sky 1708 becomes darker and the volcano 1702 becomes lighter to indicate that the volcano is becoming increasingly more likely to erupt. The representation of the volcano 1702 also changes to increasingly show the likelihood of the volcano erupting. For example, in a first state, the volcano 1702 may be shown as stable, and in a fifth state the volcano 1702 shown with emanating smoke and lava.

In addition, in this example, the state of the background scene 1700 also depends on the current state of the game implemented by the game controller 202. For example, the game state may be selected and/or may be caused to change when a Wild feature occurs, when a Wild feature animation is displayed, and/or when an eruption feature is triggered, with the state of the background scene also decrementing according the state of the game, for example so as to return to a first state after completion of a Wild feature or eruption feature.

Prior to and during implementation of base games, a continuous attract loop is carried out whereby the character 1704 and/or the volcano 1702 animates for the purpose of attracting players. When the gaming system is in a playable state, that is with credit on the credit meter, the attraction animation may be replaced, for example randomly, with an anticipation animation wherein the character animates in a different way than it does during the attraction animation. For example, when the gaming system is in a playable state, the gaming system may apply a 1 in 50 chance that the character anticipation animation will occur. Similarly, the volcano 1702 may have different animation types according to the game state that include at least one attraction animation and at least one anticipation animation.

In addition to the attract and anticipation animations, the gaming device 200 may emit light that is configured and coordinated according to the game state, for example such that edge lighting of the gaming device 200 is different during display of the attract and anticipation animations.

As with the base game 704 of the standard game play option 604, prior to each base game, any special Wild symbols 2102 that are present in the display area 1800, for example because they have been added in response to occurrence of a Wild symbol 1802 at a location at which a previously added Wild symbol 1802 has been moved to are removed 1204 and the reels caused to spin, as shown in FIG. 12. Similarly to the base game of the standard game play option, at the start of each base game, the displayed Wild symbols 1802 are moved relative to the display area, in this example each displayed Wild symbol 1802 moving 1 position upwards 1206 relative to the display area 1800. However, it will be understood that the game controller 202 may be arranged to move the displayed Wild symbols 1802 in a different way, for example to multiple display positions, a randomly selected number of display positions and/or in a direction that is different to upwards.

As with the base game of the standard game play option, it is possible to also add a Wild symbol 1802 to a location outside the display area 1800, with the external Wild symbol 1802 moving to a location inside the display area 1800 in a subsequent base game. Similarly, a Wild symbol 1802 that is located at an uppermost display area location will move out of the display area 1800 in a subsequent base game.

After movement of the existing persistent Wild symbols 1802 has occurred, the reels are caused to stop rotating 1208 in order to display a new set of symbols, and the game controller 202 makes a determination 1210 as to whether no Wild feature will be implemented or which of a plurality of available Wild features will be implemented.

In this example, if the determination 1210 is that no Wild feature will be implemented 1212 for the current base game, the game controller 202 determines 1220 whether the selected symbols displayed in the display area 1800 correspond to a winning outcome, taking into account any persistent Wild symbols 1802 currently displayed in the display area 1800.

In this example, if the determination 1210 is that a Wild feature will be implemented for the current base game, the game controller 202 implements one of 3 available Wild features 1224, 1226 and 1228.

The Wild features that may be implemented by the game controller 202 are shown in more detail in FIG. 13.

A first Wild feature 1224 is similar to the Wild feature that forms part of the base game of the standard game play option 604 described in relation to FIGS. 18 to 22, in that the game controller 202 automatically selects 1304 the number of Wild symbols to add and the locations 1306 in the display area 1800 of the added Wild symbols. The game controller 202 then causes an animation to be displayed wherein a metamorphic fireball is shown to be expelled from the volcano 1702 and to move along a path towards the display area location selected for the Wild symbol 1802. The animation(s) for the fireballs corresponding to the added Wild symbols 1802 may be timed such that the fireballs land at the same time or just before the relevant reel that includes the selected location stops. In this example, the game controller 202 is arranged such that for any base game if multiple Wild symbols 1802 are added then 2 Wild symbols cannot be added to the same location.

When a Wild symbol 1802 lands in the display area 1800, in this example an animation is displayed that concludes by adding the word WILD to the fireball. If it is determined at step 1308 that the new Wild symbol 1802 is added to a location that already includes a persistent Wild symbol 1802 added in a previous base game, then an animation is displayed 1310 to indicate that the Wild symbols 1802 at the display location are ready to explode. After it is determined at step 1312 that all new Wild symbols have been selected and have landed onto or below the display area, all locations that now have 2 Wild symbols 'explode' 1314 to cause at least some, in this example all, immediately adjacent symbols to change to special Wild symbols 2102. Special Wild symbols 2102 have a similar appearance to the added Wild symbols 1802, but unlike the added Wild symbols 1802, the special Wild symbols 2102 are not persistent in that they are removed after completion of the base game.

A determination is then made 1332 as to whether a prize is applicable for the displayed symbols taking into account the added Wild symbols 1802 and the special Wild symbols 2102, and if so a prize is awarded 1332.

Figure 26:
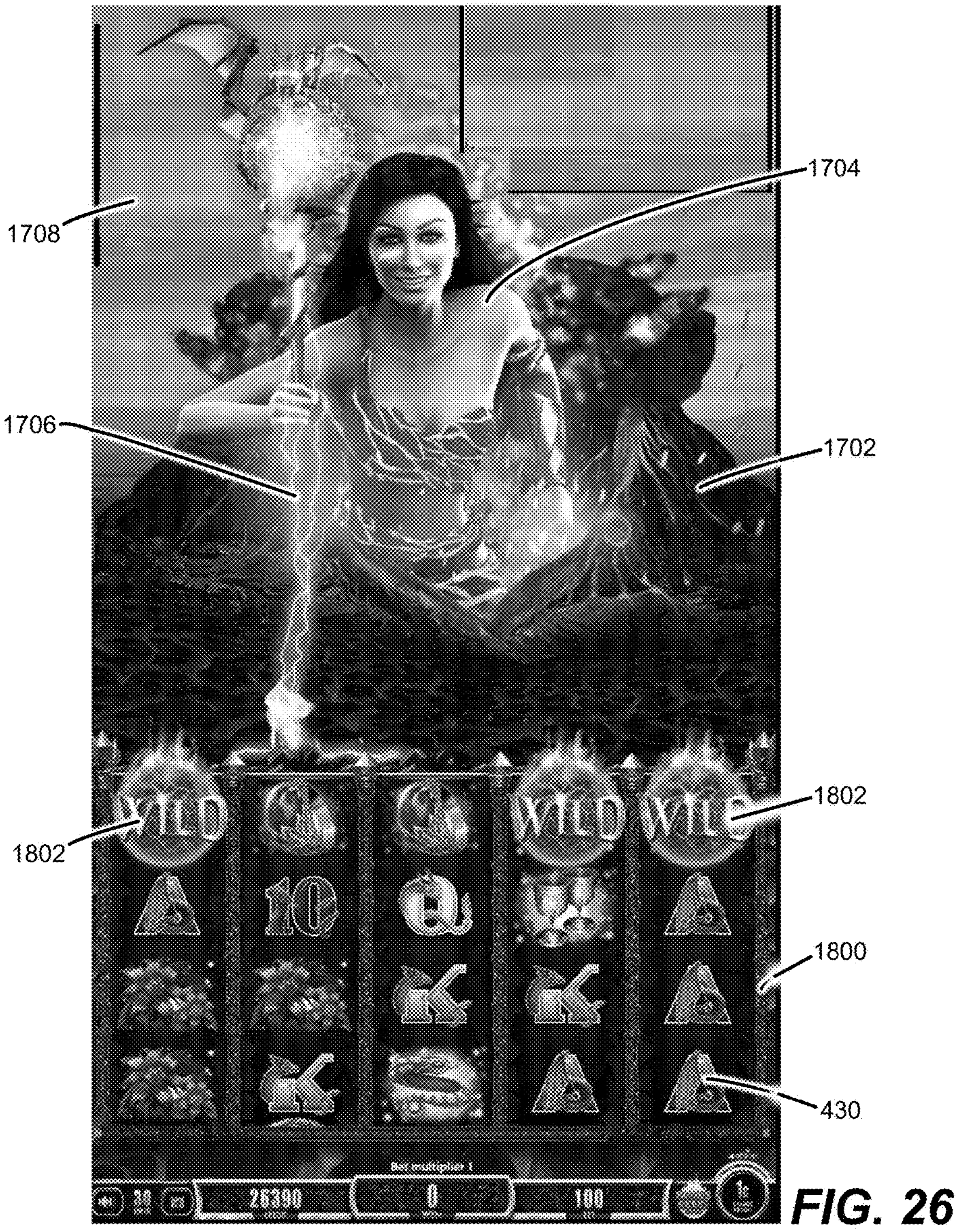
FIG. 26 is a representation of a screen displayed by the gaming system to a player during a first Wild feature of the enhanced game play option, the screen including a wild feature selection animation.
Figure 27:
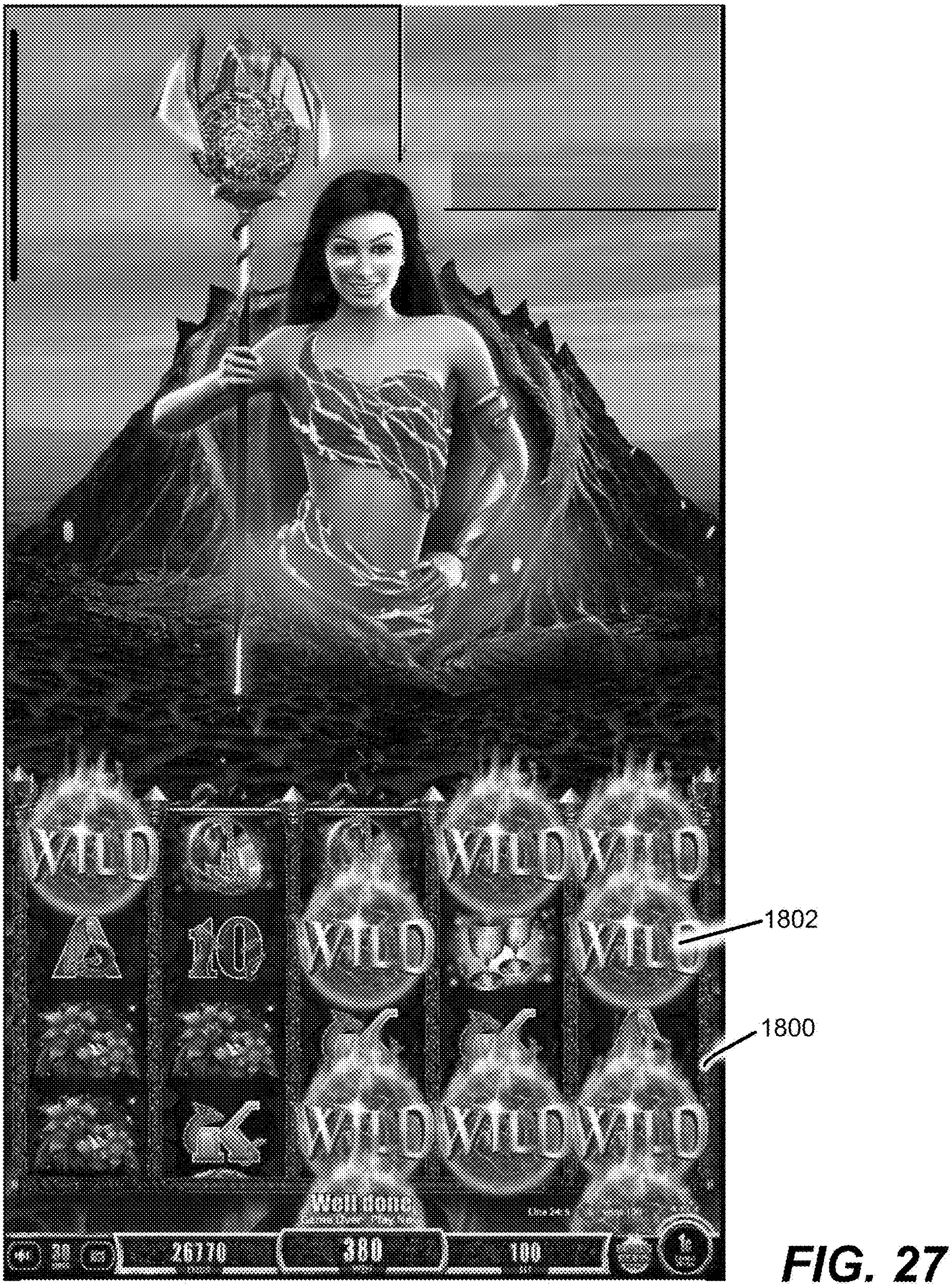
FIG. 27 is a representation of a screen displayed by the gaming system to a player during the first Wild feature of the enhanced game play option after Wild symbols have been added.

Screens displayed to a player during implementation of a second Wild feature are shown in FIGS. 26 and 27. The second Wild feature 1226 is similar to the first Wild feature 1224 in that a number of Wild symbols 1802 are added to a display area 1800, and if the new Wild symbol is added to a location that already includes a persistent Wild symbol, then the Wild symbol at the display location is marked 1326 as ready to explode. After all Wild symbols have been added, all locations that now have 2 Wild symbols 'explode' 1330. However, with the second Wild feature 1226, more Wild symbols are added than are added with the first Wild feature 1224, for example 5-10 Wild symbols instead of 1-3 Wild symbols, and the Wild symbols 1802 are added in a different manner to the first Wild feature 1224.

In addition to adding more Wild symbols than the first Wild feature 1224, the game controller 202 also implements a trigger animation 1318 for the second Wild feature 1316 that involves the character 1704 interacting with the game. In this example, the character 1704 interacts with the display area 1800, as shown in FIG. 26 such that the scepter 1706 strikes the display area 1800 and after striking the display area 1800 a dragon 1710 on an upper end of the scepter puffs bursts of fire onto the display area to cause fireballs corresponding to Wild symbols 1802 to be added to the display area 1800.

As shown in FIG. 27, in this example, after the character animation, 7 new Wild symbols 1802 have been added, including 5 Wild symbols 1802 in the display area 1800 and 2 Wild symbols 1802 below the display area 1800.

As shown in FIG. 26, during the character animation the background scene also animates, in this example so as to indicate that the volcano is erupting as the character animation is displayed.

Figure 28:
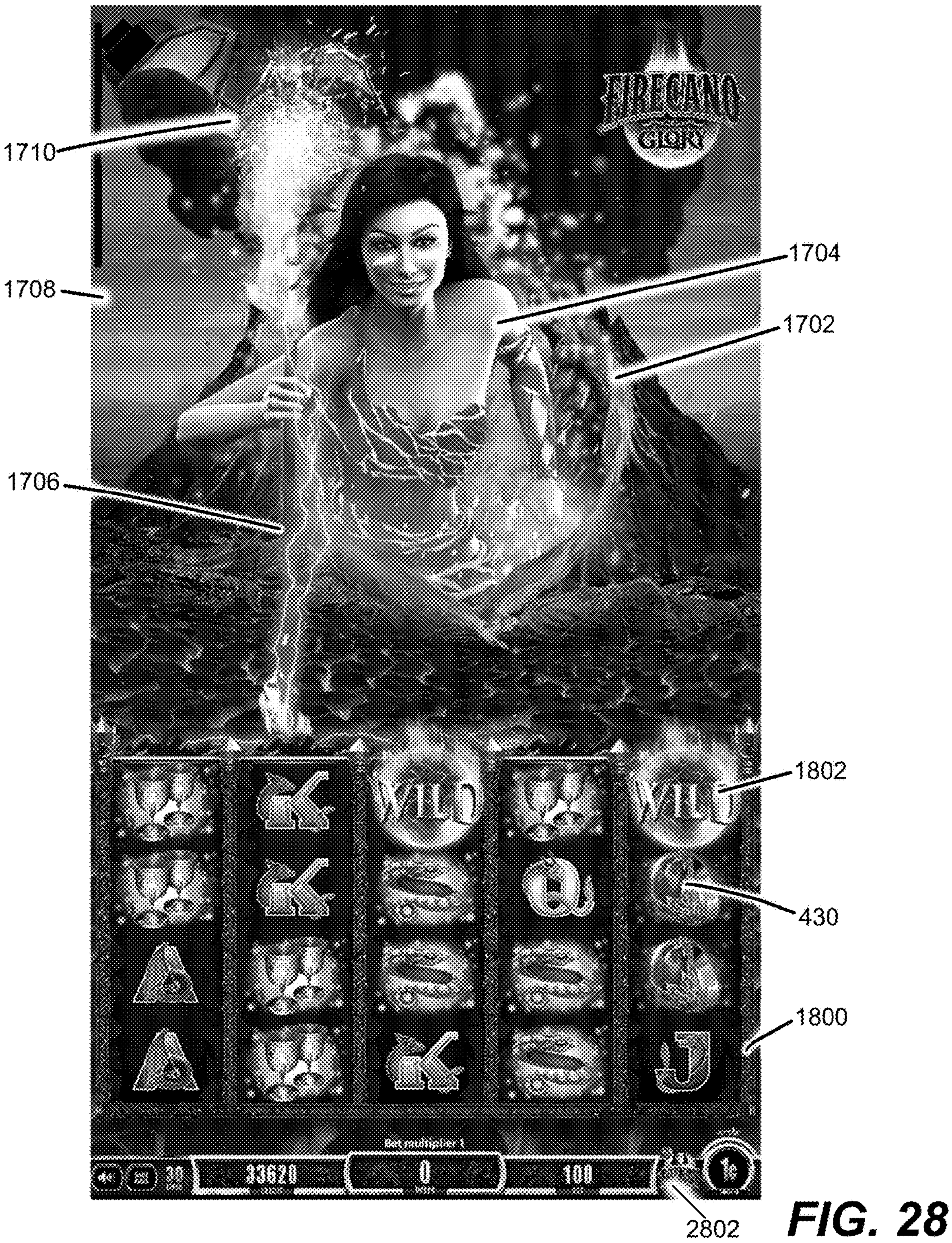
FIG. 28 is a representation of a screen displayed by the gaming system to a player during a second Wild feature of the enhanced game play option, the screen including a wild feature selection animation.
Figure 29:
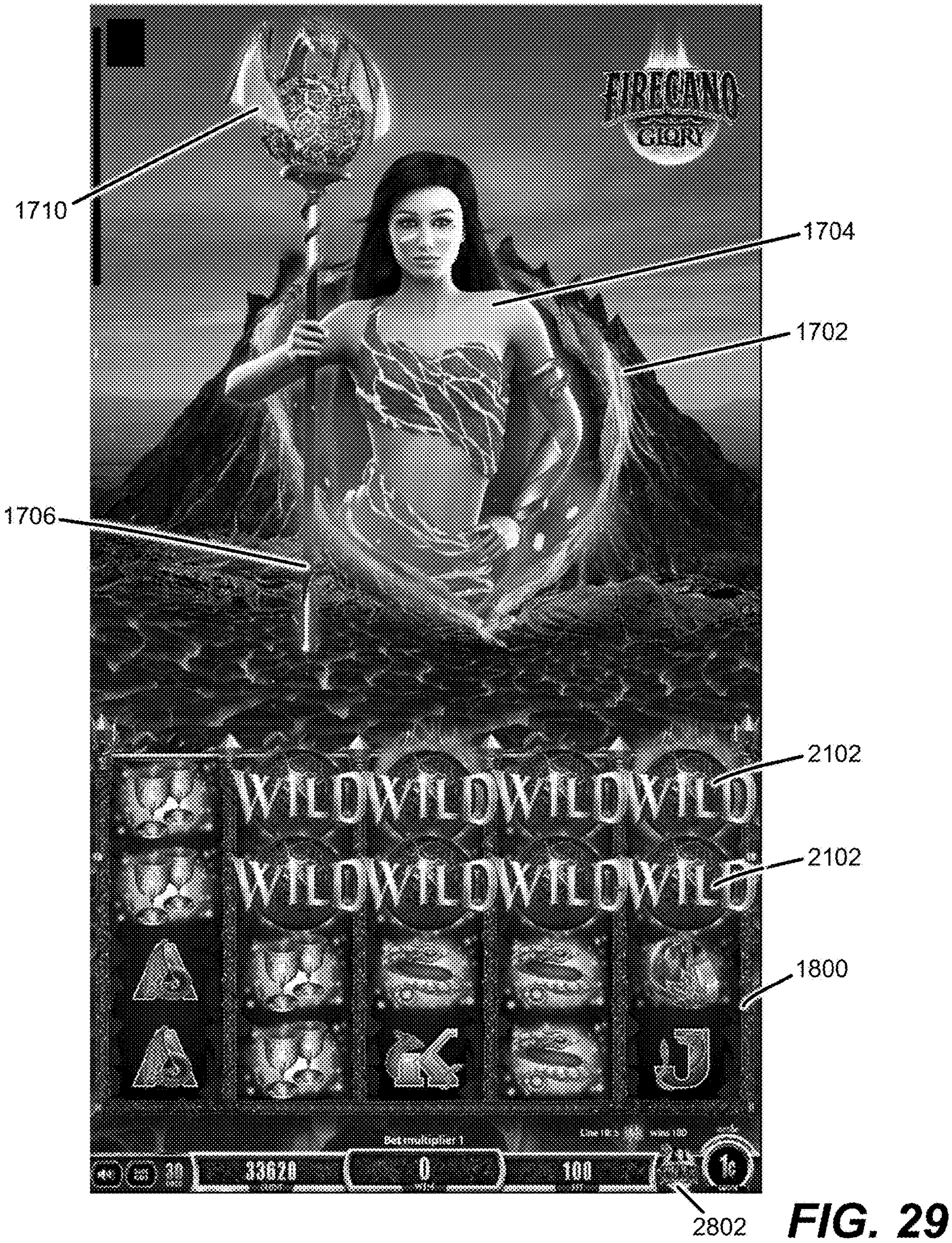
FIG. 29 is a representation of a screen displayed by the gaming system to a player during the second Wild feature of the enhanced game play option after all Wild symbols have exploded.

Screens displayed to a player during implementation of a third Wild feature are shown in FIGS. 28 and 29.

In the third Wild feature 1228, if at least one persistent Wild symbol is currently displayed in the display area, then all displayed Wild symbols are caused to explode thereby causing at least some, in this example all, adjacently disposed symbols to change to Wild symbols.

The game controller 202 also implements a trigger animation 1336 for the third Wild feature 1228 that involves the character 1704 interacting with the game. In this example, the character 1704 interacts with the display area 1800, as shown in FIG. 28 such that the scepter 1706 strikes the display area 1800 and after striking the display area 1800 a dragon 1710 on an upper end of the scepter puffs bursts of fire onto the display area to cause all Wild symbols currently in the display area 1800 to explode thereby causing at least some, in this example all, symbols adjacently disposed to the Wild symbols 1802 to change to Wild symbols.

In this example, the trigger animation 1318, 1336 implemented for the second and third Wild features 1226, 1228 includes the character 1704 raising the scepter 1706 and then downwardly striking the display area 1800 before the Wild feature is initiated, whereas the corresponding teaser animation 1218 includes only an initial portion of the trigger animation that for example includes the character 1704 raising the scepter 1706 and then lowering the scepter 1706 without striking the display area 1800.

As shown in FIG. 28, in this example 9 Wild symbols 1802 are present in the display area 1800. After all displayed Wild symbols 1802 have exploded, all display locations except a top left display location have a Wild function, as shown in FIG. 29, and a corresponding large prize is awarded.

As shown in FIG. 28, during the character animation the background scene also animates, in this example so as to indicate that the volcano is erupting as the character animation is displayed.

As shown in FIGS. 28 and 29, a play option (referred to in this example as a FRENZY mode) indicator 2802 is displayed below the display area 1800 to indicate to the player whether the selected game play option is the standard play option 604 or the enhanced play option 606 shown in FIG. 6.

Figure 30A:
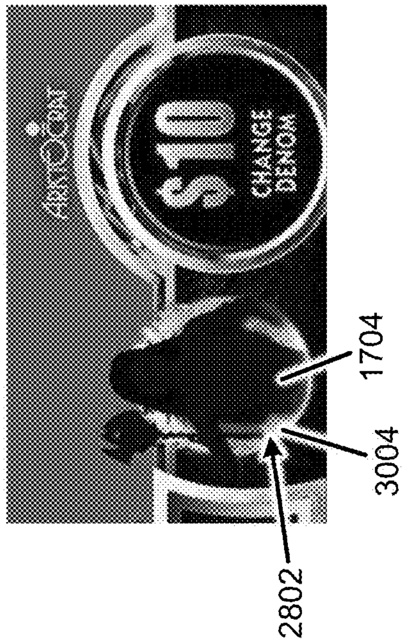
FIGS. 30*a*, 30*b*, 30*c*, and 30*d* show enlarged views of a play option indicator shown in FIGS. 28 and 29.
Figure 30B:
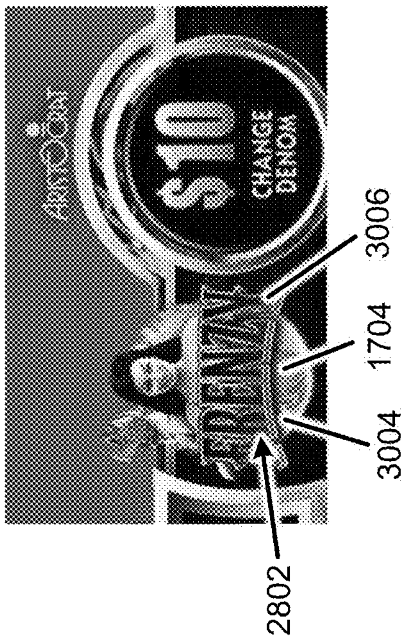

Enlarged views of the play option indicator 2802 are shown in FIGS. 30*a*-30*d*. The play option indicator 2802 in shown in an inactive state in FIG. 30*a* and an active state in FIG. 30*b* to respectively indicate whether the play option is the standard play option 604 or the enhanced play option 606. As shown in FIG. 30*a*, in the inactive state a representation of the character 1704 on a fire background 3004 is displayed, with the character 1704 shown in darkened form, and as shown in FIG. 30*b*, in the active state a representation of the character 1704 on the fire background 3004 is shown with the character 1704 shown in lightened form. In the active state, the word 'FRENZY' 3006 is also displayed.

Figure 30C:
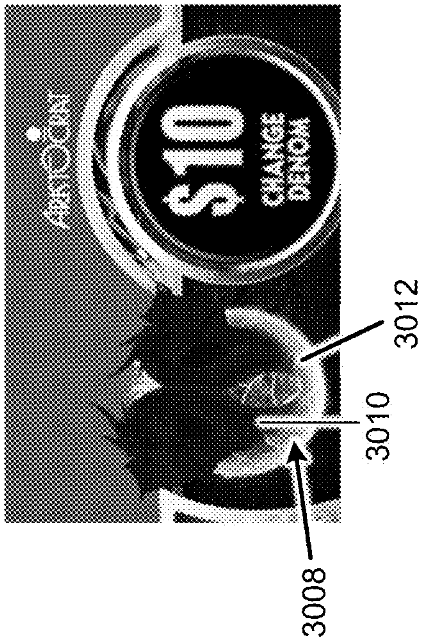
Figure 30D:
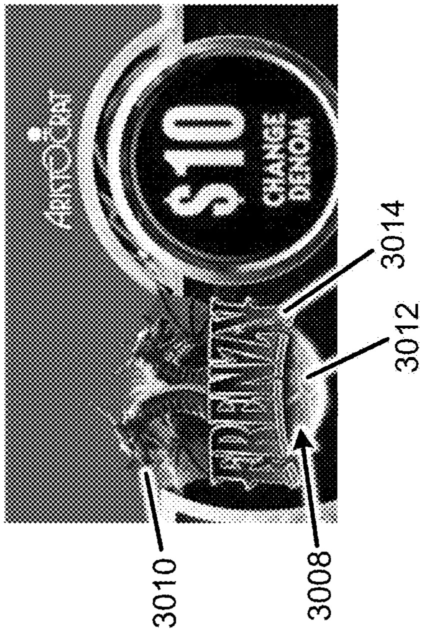

FIGS. 30*c* and 30*d* respectively show an alternative play option indicator 3008 in an inactive state and an active state. The alternative play option indicator 3008 is similar to the play option indicator shown in FIG. 30*a* and FIG. 30*b* except that the alternative play option indicator 3008 includes a different character 3010 and a different background 3012. As shown in FIG. 30*c*, in the inactive state a representation of the character 3010 is shown on the alternative background 3012, with the character 3010 shown in darkened form, and as shown in FIG. 30*d*, in the active state the character 3010 is shown in lightened form. In the active state, the word 'FRENZY' 3014 is also displayed.

In this example, in both the active and inactive states the background 3004, 3012 is the same and a silhouette effect is created as the character toggles between relatively bright and relatively dark.

As shown in FIG. 11, if a trigger condition occurs during implementation of a base game, for example selection and display of 3 or more defined trigger symbols 436 as shown in FIG. 23, at least one free feature game is implemented 1112.

In this example, the free feature game implemented during the enhanced game play option 606 is the same as the free feature game described in relation to FIGS. 9 and 10.

As shown in FIG. 11, if an eruption trigger occurs 1116 during a base game of the enhanced game play option 606, an eruption feature is implemented. However, prior to implementing the eruption feature, any persistent Wild symbols that are present are removed 1120, with the locations of the persistent Wild symbols being saved 1118 and subsequently recalled 1124 after completion of the eruption feature. In this example, the eruption trigger is randomly implemented and not dependent on the base game symbols.

Figure 14:
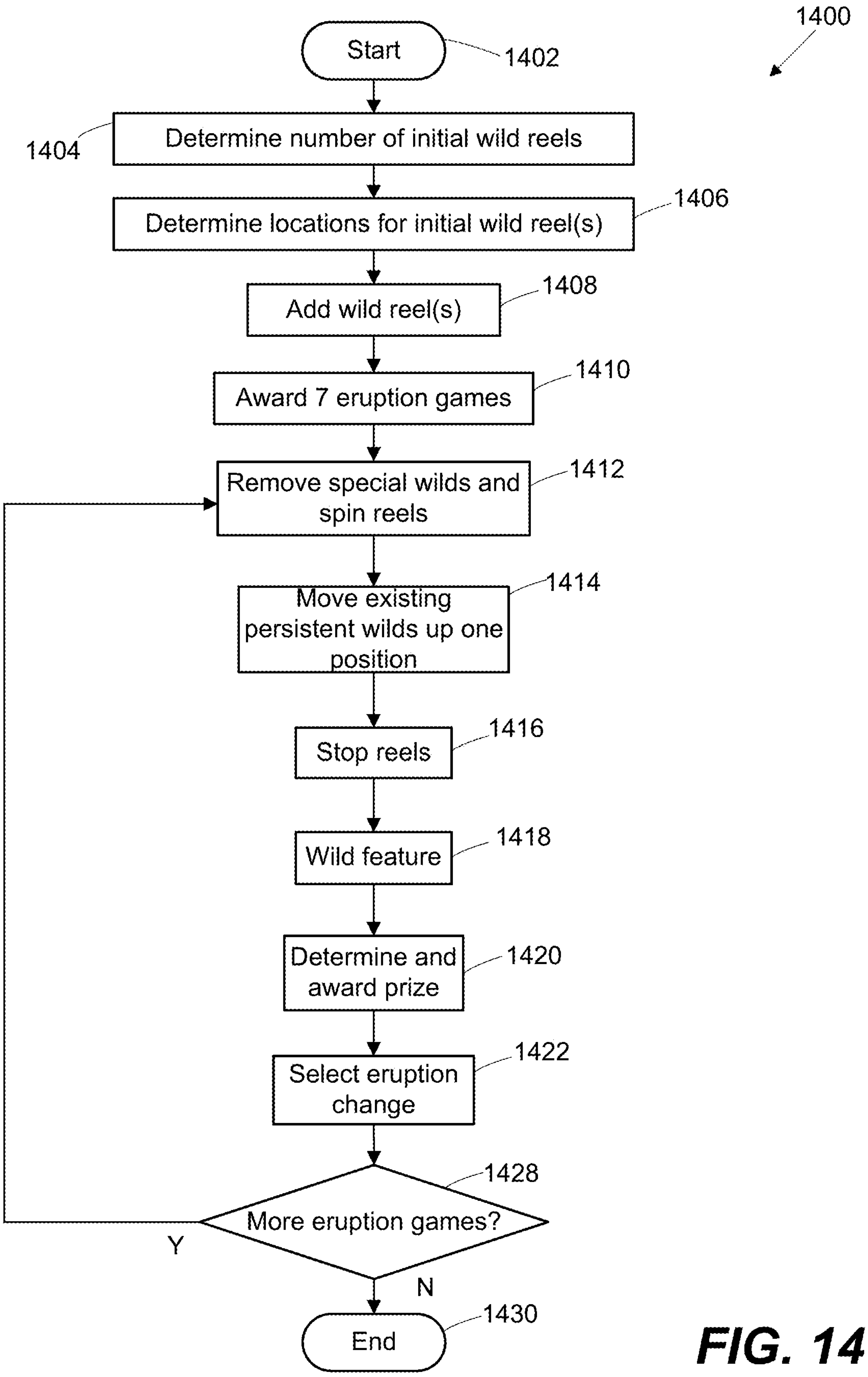
FIG. 14 is a flow chart illustrating an example implementation of an eruption game feature of the enhanced game play option shown in FIG. 12.
Figure 15:
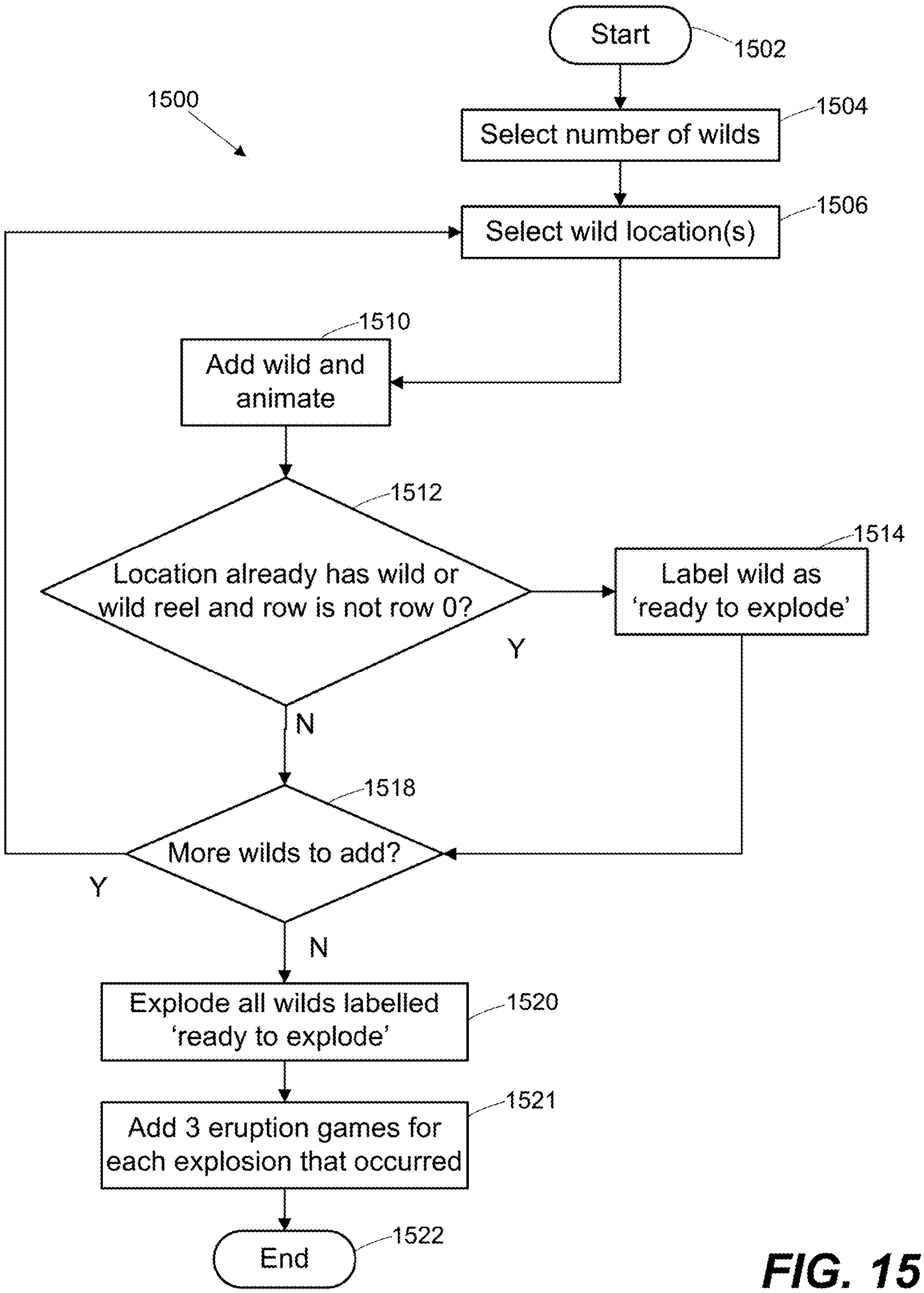
FIG. 15 is a flow chart illustrating an example implementation of a wild feature of the eruption game feature shown in FIG. 12.
Figure 16:
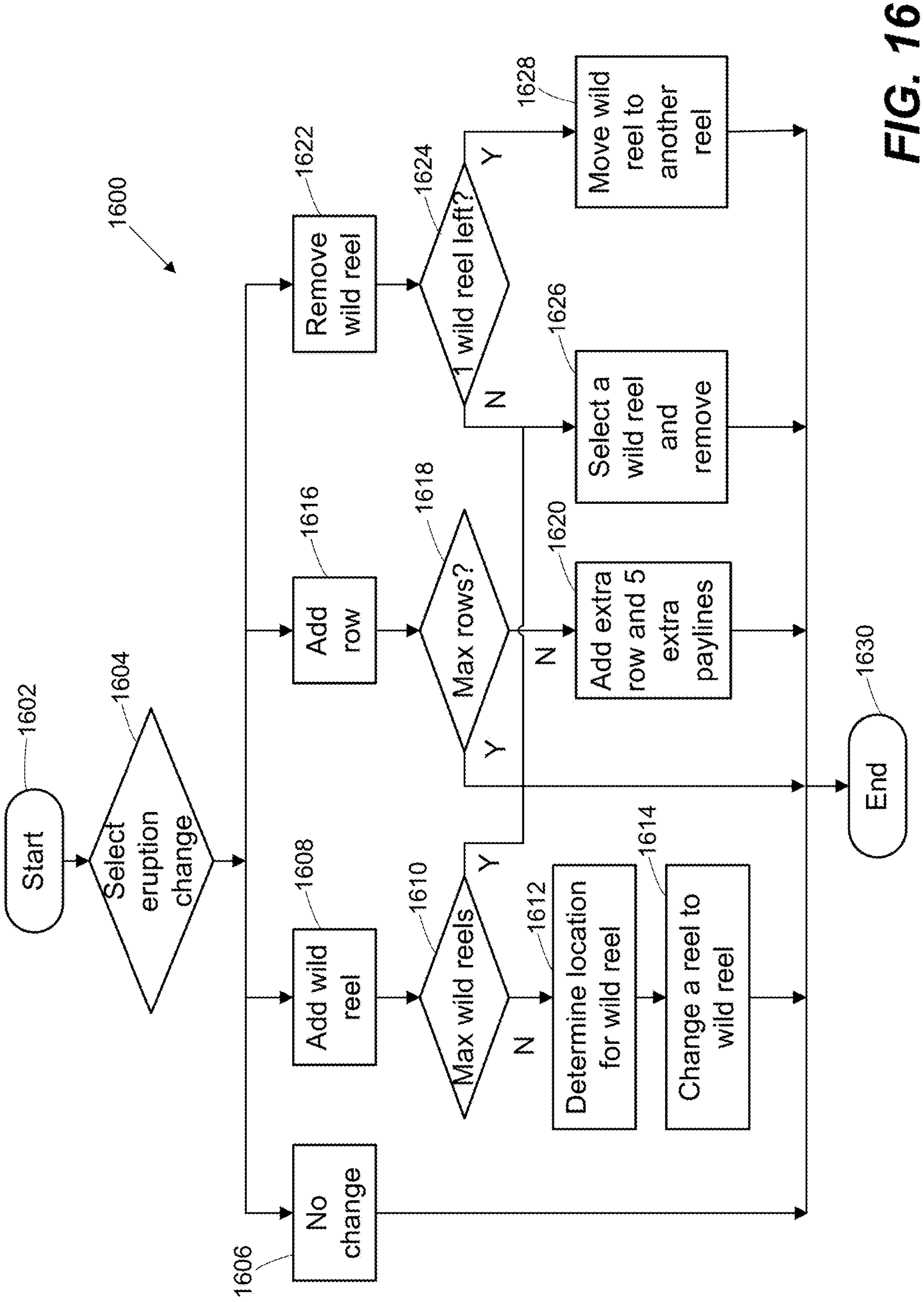
FIG. 16 is a flow chart illustrating an example implementation of an eruption game of the eruption game feature shown in FIG. 12.

FIGS. 14 to 16 show flow charts 1400, 1500, 1600 illustrating an example implementation of an eruption feature.

Screens displayed to a player during the eruption feature are shown in FIGS. 31 to 34.

In addition to exploding individual Wild symbols 1802 when 2 Wild symbols occur at the same display location, in the eruption feature, one or more reels are initially selected and the game controller 202 is arranged to change all display positions of each selected reel to a Wild function. At least one reel may be subsequently toggled to/from a Wild function depending on the state of the game and additional symbol rows may be added. Exploding Wilds occur when an added Wild symbol 1802 occurs at the same location as a Wild reel.

Figure 31:
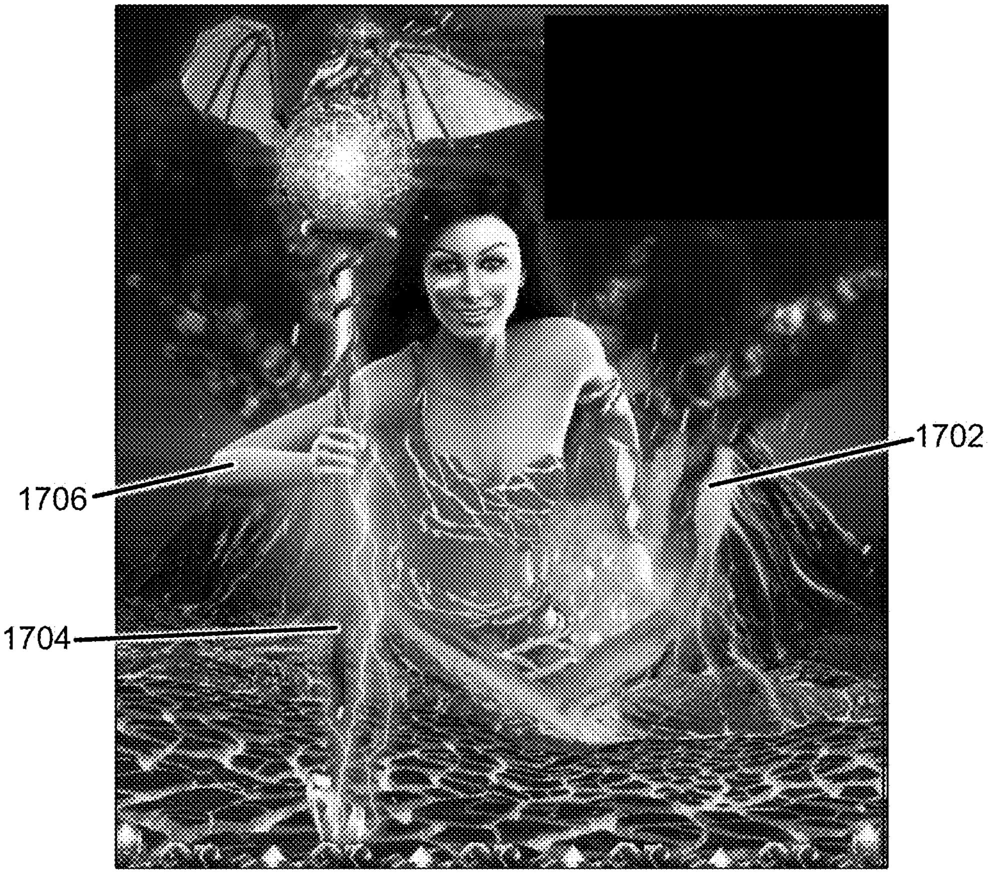
FIG. 31 is a representation of a screen displayed by the gaming system to a player prior to commencement of an eruption game feature of the enhanced game play option, the screen including an eruption game commencement animation.
Figure 32:
FIG. 32 is a representation of a screen displayed by the gaming system to a player prior to commencement of an eruption game of the enhanced game play option, the screen showing the number of eruption games that will be played in the eruption game feature.

After triggering the eruption feature, the game controller 202 implements a trigger animation for the eruption feature 1122 that involves the character 1704 interacting with the game. In this example, the character 1704 interacts with the display area 1800, as shown in FIG. 31 such that the scepter 1706 strikes the display area 1800 and after striking the display area 1800 a representation of lava 3102 flowing over the reels is displayed as shown in FIG. 32. FIG. 32 also shows a banner 3104 that indicates the number of eruption games that will be implemented. Prior to starting the trigger animation, the state of the background scene is checked and if the background scene is not at state 5, the background scene is caused to transition to state 5.

Figure 33:
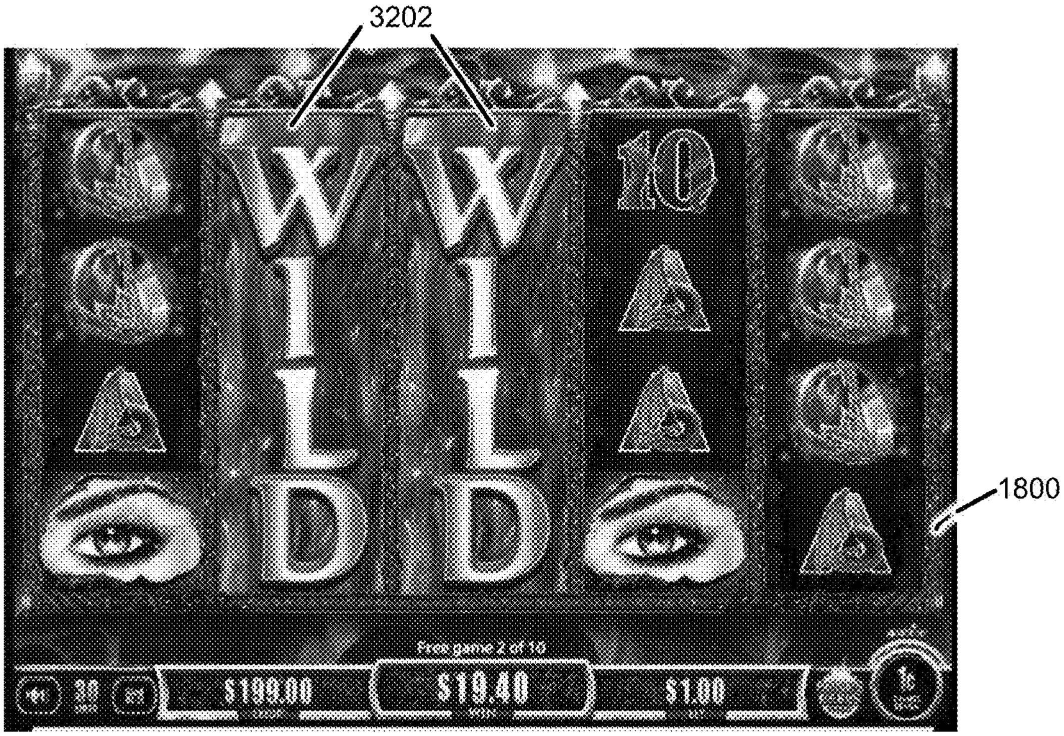
FIGS. 33 and 34 are representations of screens displayed by the gaming system to a player during implementation of the eruption game of the eruption game feature.

Referring to FIG. 14, prior to implementation of the eruption games, the game controller 202 automatically selects the number of initial Wild reels to add 1404 and the locations 1406 in the display area of the initially added Wild reels, and adds 1408 the selected Wild reels 3202 to the display area 1800 by changing the selected reels to Wild reels 3202, as shown in FIG. 33. The game controller 202 then causes 7 eruption games to be added 1410. The added Wild reels 3202 are persistent for the 7 eruption games, unless removed based on a determination made during an eruption change feature. The number of so-called "eruption games" can, of course, be altered from implementation to implementation to any desired number.

The eruption games use a different set of symbols to the set of symbols used in the base game in that the set of symbols used during the eruption games do not include trigger symbols 436. The state of symbols displayed in the triggering base game is saved so that the base game state can be restored after completion of the eruption games.

Any special Wild symbols 2102 that are present are removed 1412, and the reels are then caused to spin. While the reels are spinning, any displayed Wild symbols 1802 are moved relative to the display area 1800, in this example each displayed Wild symbol 1802 moving 1 position upwards 1414 relative to the display area 1800. However, it will be understood that the game controller 202 may be arranged to move the displayed Wild symbols 1802 in a different way, for example multiple display positions, a randomly selected number of display positions and/or in a direction that is different to upwards.

After movement of the existing persistent Wild symbols 1802 has occurred, the reels are caused to stop rotating 1416 in order to display a new set of symbols.

The game controller 202 then makes a determination as to whether a Wild feature 1418 will be implemented.

In this example, if the determination is that no Wild feature will be implemented, the game controller determines 1420 whether the selected symbols displayed in the display area 1800 correspond to a winning outcome, taking into account the added Wild reels in the display area 1800.

If the determination is that a Wild feature 1418 will be implemented for the current base game, a Wild feature process represented by a flow chart 1500 in FIG. 15 is implemented. The Wild feature 1418 starts at step 1502 and ends at step 1522.

Figure 34:
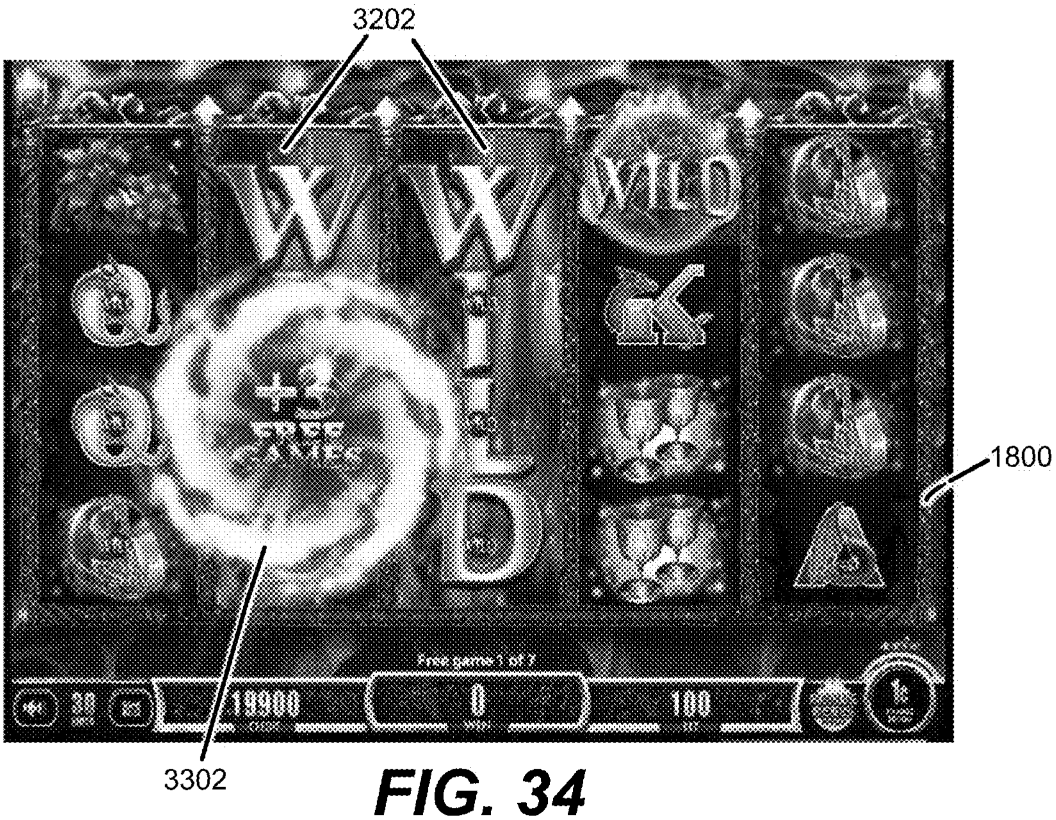

Referring to FIG. 15, during the Wild feature 1418, the game controller 202 automatically selects the number of Wild symbols to add 1504 and the locations 1506 in the display area 1800 of the added Wild symbols 1802. The number and locations of the added Wild symbols may be dependent on the current number of rows present in the symbol array. The game controller 202 causes an animation to be displayed 1510 wherein a metamorphic fireball is shown to be expelled from the volcano 1702 and to move along a path towards the display area location selected for the Wild symbol 1802. If the new Wild symbol 1802 is determined at step 1512 to be added to a location that already includes a persistent Wild symbol 1802 or that includes a Wild reel and the location is not in row 0, that is, below the display area 1800, then an animation is displayed 1514 as shown in FIG. 34, to indicate that the Wild symbol 1802 at the display location is ready to explode. After it is determined at step 1518 that all new Wild symbols have been selected and have landed onto or below the display area, all locations that now have 2 Wild symbols or a Wild symbol 1802 coinciding with a Wild reel 'explode' 1520 and cause at least some, in this example all, immediately adjacent symbols to change to special Wild symbols. The game controller 202 also adds 1521 a defined number of eruption games, for example 3 eruption games for each exploding Wild.

A determination is then made 1420 as to whether a prize is applicable for the displayed symbols taking into account the Wild reels 3302, the added Wild symbols 1802 and the special Wild symbols 2102, and if so a prize is awarded 1332.

A select eruption change process 1422 shown in the flow chart 1600 in FIG. 16 is then implemented to determine whether to make any changes to the number and location of the existing Wild reels and whether to make any changes to the number of symbol rows for a subsequent reel spin. The select eruption change process 1422 starts at step 1602 and ends at step 1630.

The game controller 202 makes a determination 1604 as to whether to make a change to the Wild reels or the symbol rows and if so which change to make.

In this example, if the determination is that a change will not be made 1606, the existing Wild reel(s) persist for a subsequent eruption game. The game controller 202 then implements further eruption games if more eruption games are available, as shown in FIG. 14.

If a change will be made, the game controller 202 determines 1604 which change will be made, as shown in FIG. 16.

During a first change, a decision is made 1608 to add a further Wild reel 3202 to the display area 1800. If a defined maximum number of Wild reels 3202 exists, for example if all reels of the display area 1800 are already Wild reels 3202, the game controller 202 causes a selected at least one Wild reel to be removed 1626. In this example, 1 reel is selected to be removed. If the number of existing Wild reels 3202 is less than the defined maximum number of Wild reels, the game controller 202 selects 1612 an existing non-Wild reel and changes 1614 the non-Wild reel to a Wild reel. The game controller 202 then reverts to step 1426 in the flow chart 1400 shown in FIG. 14 and implements a further eruption game if more eruption games are determined at step 1428 to be available using the display area configuration defined in the first change.

During a second change, a decision is made 1604 to add 1616 a further row to the display area 1800 thereby increasing the size of the symbol array in the display area 1800. If a defined maximum number of rows exists, for example if 6 rows exist, the game controller 202 reverts to step 1426 in the flow chart 1400 shown in FIG. 14 and implements further eruption games if more eruption games are determined at step 1428 to be available. If a defined maximum number of rows does not exist, the game controller 202 adds 1620 a new row to the symbol array in the display area 1800 and also adds corresponding new paylines, in this example 5 paylines. The game controller 202 then reverts to step 1426 in the flow chart 1400 shown in FIG. 14 and implements further eruption games if more eruption games are determined at step 1428 to be available using the display area configuration defined in the second change.

During a third change, a decision is made 1604 to remove 1622 a Wild reel from the display area 1800, and thereby convert the Wild reel 3202 back to a non-Wild symbol reel. If a defined minimum number of Wild reels 3202 exists, for example if 1 Wild reel exists, instead of removing the Wild reel 3202, the game controller 202 causes the Wild reel to move 1628 to a different reel of the symbol array in the display area 1800. If the number of existing Wild reels 3202 is greater than the defined minimum number of Wild reels, the game controller 202 selects and removes 1626 an existing Wild reel, thereby converting the Wild reel 3202 back to a non-Wild symbol reel. The game controller 202 then reverts to step 1426 in the flow chart 1400 shown in FIG. 14 and implements a further eruption game if more eruption games are determined at step 1428 to be available using the display area configuration defined in the third change.

It will be understood that during the eruption features, a decision as to whether to carry out an action during a game for use during a subsequent game is based on state of the game, this is, the configuration of the symbol array and the number of Wild reels. In this example, the decision as to whether to add a further Wild reel 3202, whether to add a further row, or whether to remove a Wild reel for a subsequent game is dependent on how many Wild reels exist in a current game and the number of rows that exist in the current game. It will be appreciated that such dependent decisions provide the game with apparent dynamism and volatility for a player that is consistent with the erupting volcano theme.

The game controller 202 then implements further eruption games 1428 if more eruption games are available, as shown in FIG. 14.

In a variation to the above implementation, a different character 1704 is used instead of a person holding a scepter 1706. For example, the character may be non-human, such as a 2-headed dragon.

In a variation to the free game feature illustrated in FIG. 9, instead of providing the player with an option to select a free game feature type 2402, 2404, 2406, the game controller 202 may implement a defined free game feature when the free game feature is triggered. In such a free game feature, or as part of any implemented feature, cash prizes may be associated with display positions and a cash prize awarded if a Wild symbol is added to a display position that includes the cash prize and a subsequent Wild symbol also lands on the display position.

During implementation of a game, the game controller 202 may be arranged to cause displayed components to shake to represent a potential eruption or an actual eruption. The shake effect is implemented by separately and independently shaking, trembling and/or dithering two or more displayed components to provide the effect of instability.

The shake effect may occur based on game state, for example when a symbol array is expanding in size to add one or more extra rows, at defined times during a Wild feature, free game or eruption feature such as when a feature or free game is triggered, and/or when a character trigger animation occurs when triggering a Wild feature.

In an example, the shake effect may be achieved by shaking, trembling and/or dithering reel dividers and symbols in the display area, with the reel dividers caused to shake, tremble and/or dither independent of the symbols.

However, separately shaking other displayed components is also envisaged, such as a frame of the symbol array, individual columns of symbols, individual symbols, the volcano 1702 shown in the background scene 1700, the character shown in the background scene 1700, and/or any other displayed components.

As described above, at defined states of the games implemented by the game controller, the character 1704 shown in the background scene interacts with the game display area 1800 to indicate to a player that a special feature or action is about to occur. It will be understood that the character 1704 is always present on the display, and ordinarily the character 1704 is either stationary or involved in a character animation that does not interact with the game area. However, based on the game state, the game controller 202 may cause the character 1704 to interact with the game area to give the player the impression that the character 1704 itself is causing the special feature or action to occur. In the above embodiments, the interaction involves the character 1704 striking the display area with the scepter 1706.

It will also be understood that in the present examples described above, the character 1704 interacts with the display area only during the enhanced play option 606.

In accordance with a first aspect of the present invention, there is provided a gaming system comprising:

at least one display;

a game controller that includes at least one processor and at least one memory device, wherein:

the at least one processor, the at least one memory device, and the at least one display are operably connected; and the at least one memory device stores computer-readable instructions for controlling the at least one processor to:

cause a first symbol array to be selected and displayed on the at least one display in a display area, the first symbol array including a plurality of selected symbols from each reel of a plurality of reels at respective symbol locations of the display area;

add at least one first Wild symbol to the display;

cause a second symbol array to be selected and displayed on the at least one display in the display area, the second symbol array including a plurality of selected symbols from each reel at the respective symbol locations of the display area;

add at least one second Wild symbol to the display;

move the at least one first Wild symbol relative to the display area, the at least one added first Wild symbol being persistent until moved from the display area;

if a second Wild symbol is added to a symbol location that includes a first Wild symbol, add a plurality of further Wild symbols to respective symbol locations adjacent the symbol location that includes first and second Wild symbols;

determine whether the second symbol array, the at least one first Wild symbol, the at least one second Wild symbol and the at least one further Wild symbol displayed in the display area correspond to a winning outcome; and award a prize if a winning outcome is determined to exist.

In an embodiment, the at least one memory device stores computer readable instructions for controlling the at least one processor to:

move the at least one first Wild symbol relative to the display area prior to adding at least one second Wild symbol to the display.

In an embodiment:

if a symbol location in the display area exists adjacent a first Wild symbol in a defined direction, the first Wild symbol is moved in the defined direction to the adjacent symbol location; and if a symbol location in the display area does not exist adjacent to the first Wild symbol in the defined direction, the first Wild symbol is removed from the display.

In an embodiment, the at least one memory device stores computer-readable instructions for controlling the at least one processor to:

add at least one first Wild symbol to a location adjacent and outside the display area; and move the at least one first Wild symbol to an adjacent symbol location inside the display area.

In an embodiment, the at least one memory device stores computer-readable instructions for controlling the at least one processor to:

add at least one first Wild symbol to a location adjacent and below the display area; and move the at least one first Wild symbol up to an adjacent symbol location inside the display area.

In an embodiment, the at least one memory device stores computer-readable instructions for controlling the at least one processor to:

spin the reels prior to display of a selected symbol array;

move the at least one first Wild symbol relative to the display area as the reels are spinning.

In an embodiment, the at least one memory device stores computer-readable instructions for controlling the at least one processor to:

for each second Wild symbol added to a symbol location that includes a first Wild symbol, provide a visual indication that the second Wild symbol has been added to the symbol location that includes the first Wild symbol; and after all second Wild symbols have been added, add all of the plurality of further Wild symbols to the symbol locations adjacent the symbol locations that include the first and second Wild symbols.

In an embodiment, the at least one memory device stores computer-readable instructions for controlling the at least one processor to:

cause a further Wild symbol to be added to all symbol locations adjacent the symbol location that includes first and second Wild symbols.

In an embodiment, the at least one memory device stores computer-readable instructions for controlling the at least one processor to:

cause a further Wild symbol to be added to defined symbol locations adjacent the symbol location that includes first and second Wild symbols, the defined symbol locations determined according to defined criteria.

In an embodiment, the at least one further Wild symbol is not persistent for subsequent selections of a symbol array.

In an embodiment, the at least one memory device stores computer-readable instructions for controlling the at least one processor to:

determine how many first and/or second Wild symbols to add to the display according to defined criteria.

In an embodiment, the at least one memory device stores computer-readable instructions for controlling the at least one processor to:

determine whether 1, 2 or 3 first and/or second Wild symbols are added to the display.

In an embodiment, the at least one memory device stores computer-readable instructions for controlling the at least one processor to:

determine whether or not to implement a Wild feature;

add at least one second Wild symbol to the display if the determination is to implement the Wild feature; and not add any second Wild symbols to the display if the determination is that a Wild feature will not be implemented.

In an embodiment, the at least one memory device stores computer-readable instructions for controlling the at least one processor to:

remove all added further Wild symbols from the display before subsequent selection and display of a symbol in the display area.

In an embodiment, each symbol array is selected from a set of symbols that does not include any Wild symbols.

In an embodiment, the at least one memory device stores computer-readable instructions for controlling the at least one processor to:

display an add Wild animation when a first and/or second Wild symbol is added to the display, the Wild animation including ejection of a fireball from a volcano to the symbol location selected for the Wild symbol.

In an embodiment, the Wild animation includes addition of further fireballs to the respective symbol locations adjacent the symbol location that includes first and second Wild symbols.

In an embodiment, the at least one memory device stores computer-readable instructions for controlling the at least one processor to:

display a background scene; and change the appearance of the background scene according to defined criteria.

In an embodiment, the defined criteria includes the amount of game play; and/or the current status of game play.

In an embodiment, the background scene has a defined number of states, and the at least one memory device stores computer-readable instructions for controlling the at least one processor to select the background scene state based on the defined criteria.

In an embodiment, the background scene states progressively represent an increasing likelihood of eruption of a volcano.

In an embodiment, the at least one memory device stores computer-readable instructions for controlling the at least one processor to:

provide a plurality of different Wild features;

select one of the Wild features; and implement the selected one of the Wild features.

In an embodiment, the plurality of selectable Wild features includes a first Wild feature that comprises adding a first number of second Wild symbols to the display and, if a second Wild symbol is added to a symbol location that includes a first Wild symbol, adding a plurality of further Wild symbols to respective symbol locations adjacent the symbol location that includes first and second Wild symbols.

In an embodiment, the plurality of selectable Wild features includes a second Wild feature that comprises adding a second number of second Wild symbol to the display and, if a second Wild symbol is added to a symbol location that includes a first Wild symbol, adding a plurality of further Wild symbols to respective symbol locations adjacent the symbol location that includes first and second Wild symbols, the second number greater than the first number.

In an embodiment, the plurality of selectable Wild features includes a third Wild feature that comprises:

instead of adding a second Wild symbol to the display and adding a plurality of further Wild symbols to respective symbol locations adjacent a symbol location that includes first and second Wild symbols, adding a plurality of further Wild symbols to all symbol locations that include the first Wild symbols without adding any second Wild symbols.

In an embodiment, the at least one memory device stores computer-readable instructions for controlling the at least one processor to:

determine when a special trigger condition has occurred; and implement a special feature when the special feature trigger is determined to have occurred;

wherein the special feature comprises:

replacing at least one reel with a Wild reel, wherein each symbol location of the Wild reel has an associated Wild function;

adding at least one Wild symbol to the display; and if a Wild symbol is added to a symbol location disposed on a Wild reel, adding a plurality of further Wild symbols to respective symbol locations adjacent the symbol location that is disposed on the Wild reel.

In an embodiment, the at least one memory device stores computer-readable instructions for controlling the at least one processor to:

determine whether or not to implement a change to the display area;

implement the change if the determination is to implement the change; and do not implement the change if the determination is to not implement the change.

In an embodiment, the change to the display area is selectable from a plurality of available changes.

In an embodiment, the plurality of available changes includes a first change that comprises:

if at least one reel is not a Wild reel, replacing at least one reel that is not a Wild reel with a Wild reel, wherein each symbol location of the Wild reel has an associated Wild function;

if all reels are Wild reels, removing a selected Wild reel;

selecting and displaying a further symbol array;

determining whether the further symbol array and the at least one Wild reel correspond to a winning outcome; and award a prize if a winning outcome is determined to exist.

In an embodiment, the plurality of available changes includes a second change that comprises:

if the symbol array comprises less than a defined maximum number of rows, adding at least one row of symbols to the symbol array, selecting and displaying a further symbol array, and determining whether the further symbol array and the at least one Wild reel correspond to a winning outcome;

if the symbol array comprises the defined maximum number of rows, selecting and displaying a further symbol array, and determining whether the further symbol array and the at least one Wild reel correspond to a winning outcome; and awarding a prize if a winning outcome is determined to exist.

In an embodiment, the plurality of available changes includes a third change that comprises:

if the symbol array comprises at least a defined minimum number of Wild reels, removing at least one Wild reel from the symbol array, selecting and displaying a further symbol array, and determining whether the further symbol array and the at least one Wild reel correspond to a winning outcome;

if the symbol array comprises the defined minimum number of Wild reels, moving a Wild reel to a different reel, and determining whether the further symbol array and the at least one Wild reel correspond to a winning outcome; and awarding a prize if a winning outcome is determined to exist.

In an embodiment, the at least one memory device stores computer-readable instructions for controlling the at least one processor to:

display a special feature animation when a Wild reel is added, the special feature animation including eruption of a volcano and/or flow of lava over at least one reel.

In an embodiment, the at least one memory device stores computer-readable instructions for controlling the at least one processor to:

cause at least 2 displayed components to independently shake in response to game play.

In an embodiment, the gaming system comprises a plurality of reel dividers, each reel divider disposed between an adjacent pair of reels, wherein the at least one memory device stores computer-readable instructions for controlling the at least one processor to:

shake the reel dividers; and shake the symbol array independently of the reel dividers thereby providing an instability effect.

In an embodiment, the at least one memory device stores computer-readable instructions for controlling the at least one processor to:

enable a player to select a standard play option or an enhanced play option;

wherein the enhanced play option requires a higher wager than the standard play option, and the enhanced play option includes more game features than the standard play option.

In an embodiment, the at least one memory device stores computer-readable instructions for controlling the at least one processor to:

always display a character on the display; and cause the character to interact with the symbol display area based on defined criteria.

In an embodiment, the at least one memory device stores computer-readable instructions for controlling the at least one processor to:

cause the character to interact with the symbol display area when a defined feature is implemented to thereby providing an impression that the character is causing the feature to occur.

In an embodiment, the at least one memory device stores computer-readable instructions for controlling the at least one processor to:

cause display of a teaser animation arranged to commence display of the character interaction but cease display of the character interaction before the character interacts with the symbol display area.

In an embodiment, the character interaction with the symbol display area comprises the character or an item associated with the character contacting the display area.

In an embodiment, the character has an associated scepter, and the interaction with the symbol display area comprises the character striking the display area with the scepter.

In an embodiment, the teaser animation comprises display of the character raising the scepter and subsequently lowering the scepter without striking the display area.

In an embodiment, the at least one memory device stores computer-readable instructions for controlling the at least one processor to:

modify the number of display locations after at least one first Wild symbol is added to the display such that at least one added first Wild symbol is persistent for at least one further move before the first Wild symbol is removed from the display.

In accordance with a second aspect of the present invention, there is provided a gaming system comprising:

at least one display;

a game controller that includes at least one processor and at least one memory device, wherein:

the at least one processor, the at least one memory device, and the at least one display are operably connected; and the at least one memory device stores computer-readable instructions for controlling the at least one processor to:

cause a first symbol array to be selected and displayed on the at least one display in a display area, the first symbol array including a plurality of selected symbols from each reel of a plurality of reels at respective symbol locations of the display area;

add at least one first Wild symbol to the display;

cause a second symbol array to be selected and displayed on the at least one display in the display area, the second symbol array including a plurality of selected symbols from each reel at the respective symbol locations of the display area;

add at least one second Wild symbol to the display;

move the at least one first Wild symbol relative to the display area, the at least one added first Wild symbol being persistent until moved from the display area;

if a second Wild symbol is added to a symbol location that includes a first Wild symbol, add a plurality of further Wild symbols to respective symbol locations adjacent the symbol location that includes first and second Wild symbols;

determine whether the second symbol array, the at least one first Wild symbol, the at least one second Wild symbol and the at least one further Wild symbol displayed in the display area correspond to a winning outcome; and award a prize if a winning outcome is determined to exist.

Also disclosed is a gaming system comprising:

at least one display;

a game controller that includes at least one processor and at least one memory device, wherein:

the at least one memory device stores computer-readable instructions for controlling the at least one processor to:

cause a symbol array to be selected and displayed on the at least one display in a display area, the symbol array including a plurality of selected symbols from each reel of a plurality of reels at respective symbol locations of the display area;

cause at least 2 displayed components to independently shake in response to game play thereby providing an instability effect.

In an embodiment, the displayed components include any 2 or more of:

a plurality of reel dividers, each reel divider disposed between an adjacent pair of reels;

the symbol array;

a plurality of symbols in the display area;

a frame of the symbol array;

individual columns of symbols;

an individual symbol; and indicia shown in a background scene;

wherein the at least one memory device stores computer-readable instructions for controlling the at least one processor to:

shake a first one of the displayed components; and shake a second one of the displayed components independently of the first one of the displayed components.

In an embodiment, the at least one memory device stores computer-readable instructions for controlling the at least one processor to:

cause the at least 2 displayed components to independently shake when a defined feature is implemented.

Also disclosed is a gaming system comprising:

at least one display;

a game controller that includes at least one processor and at least one memory device, wherein:

the at least one memory device stores computer-readable instructions for controlling the at least one processor to:

cause a symbol array to be selected and displayed on the at least one display in a display area, the symbol array including a plurality of selected symbols from each reel of a plurality of reels at respective symbol locations of the display area;

always display a character on the display; and cause the character to interact with the symbol display area based on defined criteria.

In an embodiment, the at least one memory device stores computer-readable instructions for controlling the at least one processor to:

cause the character to interact with the symbol display area when a defined feature is implemented to thereby provide an impression that the character is causing the feature to occur.

In an embodiment, the at least one memory device stores computer-readable instructions for controlling the at least one processor to:

cause an animation to commence after the character has interacted with the symbol display area.

In an embodiment, the at least one memory device stores computer-readable instructions for controlling the at least one processor to:

add at least one Wild symbol to the display; and cause an add Wild animation to commence after the character has interacted with the symbol display area In an embodiment, the at least one memory device stores computer-readable instructions for controlling the at least one processor to:

add at least one Wild column to the display; and cause an add Wild column animation to commence after the character has interacted with the symbol display area.

In an embodiment, the at least one memory device stores computer-readable instructions for controlling the at least one processor to:

display a background scene; and change the appearance of the background scene when the character interacts with the symbol display area.

In an embodiment, the character interaction with the symbol display area comprises the character or an item associated with the character contacting the display area.

In an embodiment, the character has an associated scepter, and the interaction with the symbol display area comprises the character striking the display area with the scepter.

In an embodiment, the at least one memory device stores computer-readable instructions for controlling the at least one processor to:

cause display of a teaser animation arranged to commence display of the character interaction but cease display of the character interaction before the character interacts with the symbol display area;

wherein the teaser animation comprises display of the character raising the scepter and subsequently lowering the scepter without striking the display area.

Also disclosed is a gaming system comprising:

at least one display;

a game controller that includes at least one processor and at least one memory device, wherein:

the at least one processor, the at least one memory device, and the at least one display are operably connected; and the at least one memory device stores computer-readable instructions for controlling the at least one processor to:

cause a first symbol array to be selected and displayed on the at least one display in a display area, the first symbol array including a plurality of selected symbols from each reel of a plurality of reels at respective symbol locations of the display area;

award a prize if the first symbol array is determined to correspond to a winning outcome;

cause a second symbol array to be selected and displayed on the at least one display in the display area, the second symbol array including a plurality of selected symbols from each reel at the respective symbol locations of the display area;

determine a modification to the display area or to at least one symbol displayed in the display area based on a game state after the determination of the winning outcome for the first symbol array selection;

modify the display area or the at least one symbol displayed in the display area if the determination is that a modification is to be implemented; and award a prize if a winning outcome is determined to exist.

In an embodiment, the at least one memory device stores computer-readable instructions for controlling the at least one processor to:

determine a modification to the display area or to at least one symbol displayed in the display area based on the configuration of the display area after the determination of the winning outcome for the first symbol array selection.

In an embodiment, the at least one memory device stores computer-readable instructions for controlling the at least one processor to:

replace at least one column of the selected first symbol array with at least one first Wild column, the at least one first Wild column including a plurality of symbol locations wherein each symbol location has an associated Wild function, and the Wild column being persistent for at least one subsequent selection and display of a symbol array.

In an embodiment, the at least one memory device stores computer-readable instructions for controlling the at least one processor to:

add at least one Wild symbol to the display;

if a Wild symbol is added to a symbol location that includes an existing Wild symbol or that corresponds to a symbol location of a Wild column, add at least one Wild symbol to respective symbol locations adjacent the symbol location that:

includes an existing Wild symbol and an added Wild symbol; or that includes the added Wild symbol and is a symbol location of a Wild column;

determine whether the symbol array corresponds to a winning outcome; and award a prize if a winning outcome is determined to exist.

In an embodiment, the at least one memory device stores computer-readable instructions for controlling the at least one processor to:

determine a modification to the display area or to at least one symbol displayed in the display area based on the number of Wild columns present in the display area after the determination of the winning outcome for the first symbol array selection.

In an embodiment, the at least one memory device stores computer-readable instructions for controlling the at least one processor to:

determine whether or not to implement a game feature; and implement the game feature if the determination is to implement the game feature; and do not implement the game feature if the determination is to not implement the game feature.

In an embodiment, the game feature is selectable from a plurality of game features.

In an embodiment, the plurality of game features includes a first game feature that comprises:

if at least one column is not a Wild column prior to selection of the second symbol array, replacing at least one further column of the display area that is not a Wild column with a Wild column; and if all columns of the display area are Wild columns prior to selection of the second symbol array, removing a selected Wild reel.

In an embodiment, the plurality of game features includes a second game feature that comprises:

if the symbol array comprises less than a defined maximum number of rows prior to selection of the second symbol array, adding at least one row of symbols to the symbol array, selecting and displaying a further symbol array; and if the symbol array comprises the defined maximum number of rows prior to selection of the second symbol array, selecting and displaying a further symbol array.

In an embodiment, the plurality of special Wild features includes a third game feature that comprises:

if the symbol array comprises at least a defined minimum number of Wild columns prior to selection of the second symbol array, removing at least one Wild column from the symbol array; and if the symbol array comprises the defined minimum number of Wild columns prior to selection of the second symbol array, moving a Wild column to a different column of the display area, and determining whether the further symbol array and the at least one Wild reel correspond to a winning outcome.

While the invention has been described with respect to the figures, it will be appreciated that many modifications and changes may be made by those skilled in the art without departing from the spirit of the invention. Any variation and deviation from the above description and figures are included in the scope of the present invention as defined by the claims.

What is claimed is:

1. A system for achieving a given level of volatility while maintaining a target level of return to player ("RTP") at an electronic gaming device, the system comprising at least one processor and at least one memory storing instructions which, when executed by the at least one processor, cause the at least one processor to perform operations comprising:

causing display of a reconfigurable symbol display area on one or more display monitors of the electronic gaming device, the reconfigurable symbol display area having rows and columns, wherein, to change a volatility level, an associated reel for at least one of the columns is changeable between a wild reel and a non-wild reel for that column between spins of a feature;

for a first spin of the spins of the feature, causing a first symbol array to be displayed in the reconfigurable symbol display area at symbol locations enclosed by the reconfigurable symbol display area, the first symbol array showing wild symbols for any of the columns for which the associated reel has been changed to the wild reel for the first spin; and before a second spin of the spins of the feature, performing a modification to the reconfigurable symbol display area, the modification being based at least in part on state of the reconfigurable symbol display area before the second spin, thereby changing the volatility level for the target level of RTP, wherein the modification includes causing display of one of:

a change of the associated reel for one of the columns between the wild reel and the non-wild reel for that column; and an addition of a new row for the reconfigurable symbol display area.

2. The system of claim 1, wherein the operations further comprise causing display of a first indicator of a first outcome for the first spin.

3. The system of claim 1, wherein the operations further comprise:

for the second spin, causing a second symbol array to be displayed in the modified reconfigurable symbol display area at the symbol locations enclosed by the modified reconfigurable symbol display area, the second symbol array showing the wild symbols for any of the columns for which the associated reel has been changed to the wild reel for the second spin; and causing display of a second indicator of a second outcome for the second spin.

4. The system of claim 1, wherein the at least one processor is a component of a server that communicates with the electronic gaming device.

5. The system of claim 4, wherein the electronic gaming device comprises at least one of a smart phone, a tablet, a laptop, or a game console.

6. The system of claim 4, wherein the operation of causing display of the reconfigurable symbol display area on one or more display monitors of the electronic gaming device is performed by the at least one processor transmitting at least one instruction to the electronic gaming device.

7. The system of claim 1, wherein the at least one processor is a component of the electronic gaming device.

8. The system of claim 1, wherein, to change the volatility level, a number of the rows is changeable between the spins of the feature.

9. The system of claim 1, wherein the first symbol array shows only the wild symbols for any of the columns for which the associated reel has been changed to the wild reel for the first spin.

10. The system of claim 1, wherein performing the modification to the reconfigurable symbol display area changes the volatility level for the target level of RTP.

11. The system of claim 1, wherein the operations further comprise, before the spins of the feature, causing display of a prior change, on the one or more display monitors, of the associated reel for at least one of the columns from the non-wild reel for that column to the wild reel, the prior change being persistent for at least one subsequent spin of the spins of the feature.

12. The system of claim 1, wherein the state of the reconfigurable symbol display area is a number of wild reels.

13. The system of claim 1, wherein the modification to the reconfigurable symbol display area includes causing display of the change of the associated reel for the one of the columns from the non-wild reel for that column to the wild reel, the change being persistent for at least the second spin.

14. The system of claim 13, wherein the modification to the reconfigurable symbol display area includes causing display of the change of the associated reel for the one of the columns from the wild reel to the non-wild reel for that column.

15. A method for achieving a given level of volatility while maintaining a target level of return to player ("RTP") at an electronic gaming device, the method comprising:

causing display of a reconfigurable symbol display area on one or more display monitors of the electronic gaming device, the reconfigurable symbol display area having rows and columns, wherein, to change a volatility level, an associated reel for at least one of the columns is changeable between a wild reel and a non-wild reel for that column between spins of a feature;

for a first spin of the spins of the feature, causing a first symbol array to be displayed in the reconfigurable symbol display area at symbol locations enclosed by the reconfigurable symbol display area, the first symbol array showing wild symbols for any of the columns for which the associated reel has been changed to the wild reel for the first spin; and before a second spin of the spins of the feature, performing a modification to the reconfigurable symbol display area, the modification being based at least in part on state of the reconfigurable symbol display area before the second spin, thereby changing the volatility level for the target level of RTP, wherein the modification includes causing display of one of:

a change of the associated reel for one of the columns between the wild reel and the non-wild reel for that column; and an addition of a new row for the reconfigurable symbol display area.

16. The method of claim 15, wherein the operations further comprise causing display of a first indicator of a first outcome for the first spin.

17. The method of claim 15, wherein the operations further comprise:

for the second spin, causing a second symbol array to be displayed in the modified reconfigurable symbol display area at the symbol locations enclosed by the modified reconfigurable symbol display area, the second symbol array showing wild symbols for any of the columns for which the associated reel has been changed to the wild reel for the second spin; and causing display of a second indicator of a second outcome for the second spin.

18. A non-transitory computer program product including instructions executable by at least one processor to perform operations for achieving a given level of volatility while maintaining a target level of return to player ("RTP") at an electronic gaming device, the operations comprising:

causing display of a reconfigurable symbol display area on one or more display monitors of the electronic gaming device, the reconfigurable symbol display area having rows and columns, wherein, to change a volatility level, an associated reel for at least one of the columns is changeable between a wild reel and a non-wild reel for that column between spins of a feature;

for a first spin of the spins of the feature, causing a first symbol array to be displayed in the reconfigurable symbol display area at symbol locations enclosed by the reconfigurable symbol display area, the first symbol array showing wild symbols for any of the columns for which the associated reel has been changed to the wild reel for the first spin; and before a second spin of the spins of the feature, performing a modification to the reconfigurable symbol display area, the modification being based at least in part on state of the reconfigurable symbol display area before the second spin, thereby changing the volatility level for the target level of RTP, wherein the modification includes causing display of one of:

a change of the associated reel for one of the columns between the wild reel and the non-wild reel for that column; and an addition of a new row for the reconfigurable symbol display area.

19. The computer program product of claim 18, wherein the operations further comprise causing display of a first indicator of a first outcome for the first spin.

20. The computer program product of claim 18, wherein the operations further comprise:

for the second spin, causing a second symbol array to be displayed in the modified reconfigurable symbol display area at the symbol locations enclosed by the modified reconfigurable symbol display area, the second symbol array showing wild symbols for any of the columns for which the associated reel has been changed to the wild reel for the second spin; and causing display of a second indicator of a second outcome for the second spin.

* * * * *